(12) United States Patent
Wang et al.

(10) Patent No.: US 11,334,862 B2
(45) Date of Patent: May 17, 2022

(54) TERMINAL TRANSACTION METHOD, AND TERMINAL

(71) Applicant: HUAWEI TECHNOLOGIES CO., LTD., Guangdong (CN)

(72) Inventors: Sishan Wang, Beijing (CN); Xiaona Zhao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/650,720

(22) PCT Filed: Nov. 30, 2017

(86) PCT No.: PCT/CN2017/114007
§ 371 (c)(1),
(2) Date: Mar. 25, 2020

(87) PCT Pub. No.: WO2019/061801
PCT Pub. Date: Apr. 4, 2019

(65) Prior Publication Data
US 2020/0286061 A1 Sep. 10, 2020

(30) Foreign Application Priority Data
Sep. 28, 2017 (CN) .......................... 201710900511.2

(51) Int. Cl.
*G06Q 20/20* (2012.01)
*H04W 4/80* (2018.01)
(Continued)

(52) U.S. Cl.
CPC ....... *G06Q 20/204* (2013.01); *G06F 21/6218* (2013.01); *G06K 7/10297* (2013.01);
(Continued)

(58) Field of Classification Search
CPC .... G06Q 20/204; H04W 4/80; G06K 7/10297
See application file for complete search history.

(56) References Cited

U.S. PATENT DOCUMENTS 10,410,232 B1 * 9/2019 Lueken ............... G06Q 20/351
2007/0203850 A1 8/2007 Singh et al.
(Continued)

FOREIGN PATENT DOCUMENTS

CN 104471600 A 3/2015
CN 104933555 A 9/2015
(Continued)

OTHER PUBLICATIONS

EMVCo_CDCVM_BP_032019 (1) EMV® Mobile Payment Consumer Device Cardholder Verification Method-Best Practices Version 1.0, dated Mar. 15, 2019. (13 pages).
(Continued)

*Primary Examiner* — A. Hunter Wilder
(74) *Attorney, Agent, or Firm* — Westerman, Hattori, Daniels & Adrian, LLP

(57) ABSTRACT

In this application, a terminal transaction method and a terminal are provided and used to resolve a problem existing in the prior art that an NFC application does not match a type of a POS, and there is relatively poor user experience. The method includes: establishing, by a terminal, a near field communication NFC radio frequency connection to a point of sale POS, and starting up a first transaction; and selecting, by the terminal, a first NFC application corresponding to the POS, and performing the first transaction when a use condition of the first NFC application is already satisfied.

12 Claims, 7 Drawing Sheets

(51) Int. Cl.
　　*G06F 21/62*　　(2013.01)
　　*G06K 7/10*　　(2006.01)
　　*G06Q 20/34*　　(2012.01)
　　*G06Q 20/40*　　(2012.01)

(52) U.S. Cl.
　　CPC ......... *G06Q 20/206* (2013.01); *G06Q 20/352* (2013.01); *G06Q 20/405* (2013.01); *G06Q 20/4014* (2013.01); *H04W 4/80* (2018.02)

(56) References Cited

U.S. PATENT DOCUMENTS

| | | | |
|---|---|---|---|
| 2011/0191196 A1 | 8/2011 | Orr et al. | |
| 2013/0317927 A1* | 11/2013 | Bush | H04W 4/80 705/21 |
| 2015/0186864 A1 | 7/2015 | Jones et al. | |
| 2015/0327071 A1 | 11/2015 | Sharma et al. | |
| 2016/0227012 A1 | 8/2016 | Chai et al. | |
| 2017/0142159 A1 | 5/2017 | Li et al. | |
| 2018/0310157 A1 | 10/2018 | Pan et al. | |
| 2018/0375985 A1 | 12/2018 | Sun et al. | |

FOREIGN PATENT DOCUMENTS

| | | |
|---|---|---|
| CN | 105472546 A | 4/2016 |
| CN | 106855812 A | 6/2017 |
| WO | 2015/035918 A1 | 3/2015 |

OTHER PUBLICATIONS

International Search Report dated Jun. 28, 2020, issued in counterpart application No. PCT/CN2017/114007, with English translation. (21 pages).

Office Action dated Jun. 17, 2020, issued in counterpart CN application No. 201780064074.3, with English translation. (17 pages).

XP007908266 EMV Mobile Contactless Payment Technical Issues and Position Paper Version 1.0, dated Oct. 2007, total 38 pages.

Extended Search Report dated Sep. 28, 2020, issued in counterpart EP Application No. 17926750.5 (9 pages).

* cited by examiner

US 11,334,862 B2

TERMINAL TRANSACTION METHOD, AND TERMINAL

This application is a national stage of International Application No. PCT/CN2017/114007, filed on Nov. 30, 2017, which is hereby incorporated by reference in its entirety, which claims priority to Chinese Patent Application No. 201710900511.2, filed on Sep. 28, 2017, which is hereby incorporated by reference in its entirety.

TECHNICAL FIELD

This application relates to the technical field of near field communication (NFC), and in particular, to a terminal transaction method and a terminal.

BACKGROUND

An NFC technology is a short-range wireless connection technology based on radio frequency identification (RFID), and can implement near field communication between electronic devices by using a magnetic field induction. Users can safely and rapidly exchange information or perform a transaction merely by enabling devices to touch or be close to each other.

A card emulation mode is a common work mode of an NFC device. That is, the NFC device is emulated as a contactless card, such as a door control card, a bank card, or a bus card. The card emulation mode is mainly used in contactless mobile payment scenarios, such as in a shopping mall, and in traffic. A user merely needs to enable an NFC device to get close to a point of sale (POS), and confirm a transaction through verification or directly accept the transaction.

In the prior art, for the card emulation work mode, to implement a rapid card swiping transaction, and simplify user operations during transaction, a user is usually required to set a default wallet application and a default card application (which may also be referred to as an NFC application) in the default wallet application for an NFC device, and simultaneously synchronizes the setting to routing information stored by an NFC controller. When the user enables the NFC device to touch or get close to a POS, the NFC controller in the NFC device routes, to the default card application set by the user, a first service instruction sent by the POS, and a transaction process between the NFC device and the POS is implemented through interaction between the default card application and the POS.

However, if the foregoing solution is used, there are following problems: If the default card application set by the user does not match a type of the POS that initiates a present transaction (for example, when the default card application set by the user is a bus card application, and the POS that initiates the present transaction is a bank POS machine), the present transaction is finished, and the user of the NFC device needs to manually select another card application that matches the type of the POS, and a POS end also needs to re-initiate a transaction, thereby causing relatively poor user experience.

In conclusion, an existing terminal transaction manner has a problem that the NFC application does not match the type of the POS, thereby causing relatively poor user experience.

SUMMARY

In embodiments of this application, a terminal transaction method and a terminal are provided and used to resolve a problem existing in the prior art that an NFC application does not match a type of a POS, and there is relatively poor user experience.

According to a first aspect, in an embodiment of this application, a terminal transaction method is provided. The method includes the following steps: establishing, by a terminal, a near field communication NFC radio frequency connection to a point of sale POS, and starting up a first transaction; and selecting, by the terminal, a first NFC application corresponding to the POS, and performing the first transaction when a use condition of the first NFC application is already satisfied.

According to the foregoing solution, an NFC application that performs the first transaction initiated by the POS is the first NFC application that is supported by the terminal, that corresponds to the POS, and of which the use condition is satisfied. Therefore, by using the first NFC application to perform the first transaction, performing the first transaction can be completed, avoiding a problem that in the prior art, relatively poor user experience is caused when a selected NFC application does not match the type of the POS. In addition, according to the foregoing solution, a case in which the POS begins to re-initiate a transaction from transaction preprocessing because a use condition of the NFC application is unsatisfied can be further avoided, so that user experience is improved.

In a possible design, before the establishing, by a terminal, a near field communication NFC radio frequency connection to a point of sale POS, the method further includes: receiving, by the terminal, an instruction in which a user selects a second NFC application; and the selecting, by the terminal, a first NFC application corresponding to the POS, and performing the first transaction when a use condition of the first NFC application is already satisfied specifically includes: if the second NFC application does not match a type of the POS, selecting, by the terminal, the first NFC application corresponding to the POS, and performing the first transaction when the use condition of the first NFC application is already satisfied.

According to the foregoing solution, when the terminal determines that the second NFC application does not match the type of the POS, the terminal can automatically select the first NFC application that matches the type of the POS to perform the first transaction, so that when the second NFC application manually selected by the user does not match the type of the POS, a problem that relatively poor user experience is caused by operations, such as that the user manually switches NFC applications, and that a POS end re-initiates a transaction, is avoided.

In a possible design, the selecting, by the terminal, a first NFC application corresponding to the POS, and performing the first transaction when a use condition of the first NFC application is already satisfied specifically includes: receiving, by an NFC controller in the terminal, a first service instruction sent by the POS; sending, by the NFC controller, the first service instruction to a card management unit in the terminal, where a first comparison relationship and use conditions respectively corresponding to a plurality of NFC applications in the terminal are stored in the card management unit, the first comparison relationship is used to indicate one-to-one correspondences between the plurality of NFC applications and a plurality of service instructions, and the first NFC application is one of the plurality of NFC applications; selecting, by the card management unit based on the first service instruction and the first comparison relationship, the first NFC application that corresponds to the POS and that is in the plurality of NFC applications; and if a use condition of the first NFC application is already satisfied, receiving, by the first NFC application, the first service instruction, and performing the first transaction based on the first service instruction.

According to the foregoing solution, an operation of performing the first transaction can be implemented by using mutual matches between the NFC controller in the terminal, the card management unit, and the first NFC application.

In a possible design, before the receiving, by an NFC controller in the terminal, a first service instruction sent by the POS, the method further includes: receiving, by the NFC controller, a second service instruction sent by the POS; sending, by the NFC controller, the second service instruction to the card management unit; determining, by the card management unit based on the second service instruction and a second comparison relationship, at least one NFC application that matches a type of the second service instruction and that is in the plurality of NFC applications, where the second comparison relationship is used to indicate a matching relationship between the second service instruction and the plurality of NFC applications; and sending, by the card management unit to the POS, a second response message to the second service instruction, where the second response message is used to indicate at least one NFC application that matches the type of the POS and that is in the plurality of NFC applications, so that the POS generates the first service instruction based on the second response message; or sending, by the card management unit, the second service instruction to a near field communication execution environment NFCEE in which a designated NFC application in the at least one NFC application is located, receiving a second response message to the second service instruction, and sending the second response message to the POS, so that the POS generates the first service instruction based on the second response message, where the second response message is used to indicate M NFC applications that match the type of the POS and that are stored in the NFCEE, M is greater than or equal to 1, and the M NFC applications include the designated NFC application.

According to the foregoing solution, two methods for the terminal to respond to the second service instruction sent by the POS are provided. That is, the card management unit responds to the second service instruction or the NFCEE in which the designated NFC application is located responds the second service instruction.

In a possible design, before the receiving, by the first NFC application, the first service instruction, and performing the first transaction based on the first service instruction, the method further includes: sending, by the card management unit, the first service instruction to the first NFC application, or instructing, by the card management unit, the NFC controller to send the first service instruction to the first NFC application.

According to the foregoing solution, the first service instruction received by the first NFC application may be sent by the card management unit, or may be sent by the NFC controller instructed by the card management unit. In different implementation scenarios, any one of the two implementations may be used, and this is not specifically limited in the embodiments of this application.

In a possible design, the method further includes the following steps: performing, by the terminal, a preprocessing flow of the first NFC application if the use condition of the first NFC application is unsatisfied, where the preprocessing flow is used to enable the use condition of the first NFC application to be satisfied; and receiving, by the first NFC application, the first service instruction, and performing the first transaction based on the first service instruction.

According to the foregoing solution, the terminal may perform the preprocessing flow when the use condition of the first NFC application is unsatisfied, so that the use condition of the first NFC application is satisfied, and the first transaction can be performed.

In a possible design, before the receiving, by the first NFC application, the first service instruction, and performing the first transaction based on the first service instruction, the method further includes: sending, by the card management unit, the first service instruction to the first NFC application; or instructing, by the card management unit, the NFC controller to send the first service instruction to the first NFC application.

According to the foregoing solution, the first service instruction received by the first NFC application may be sent by the card management unit, or may be sent by the NFC controller instructed by the card management unit.

In a possible design, before the receiving, by the first NFC application, the first service instruction, the method further includes: triggering, by the card management unit, the POS to resend the first service instruction; receiving, by the NFC controller, the first service instruction resent by the POS; and sending, by the NFC controller to the first NFC application, the first service instruction resent by the POS; or sending, by the NFC controller to the card management unit, the first service instruction resent by the POS; and the receiving, by the first NFC application, the first service instruction, and performing the first transaction based on the first service instruction specifically includes: receiving, by the first NFC application, the first service instruction sent by the NFC controller, and responding to the first service instruction sent by the POS, to perform the first transaction, or receiving, by the first NFC application, the first service instruction sent by the card management unit, and responding to the first service instruction sent by the POS, to perform the first transaction.

According to the foregoing solution, the card management unit may trigger the POS to resend the first service instruction after the use condition of the first NFC application is satisfied, so that the first NFC application performs the first transaction based on the first service instruction resent by the POS.

In a possible design, the performing, by the terminal, a preprocessing flow of the first NFC application if the use condition of the first NFC application is unsatisfied specifically includes: if the card management unit determines that the use condition of the first NFC application indicates that the terminal needs to perform a Consumer Device Cardholder Verification Method CDCVM, and the terminal does not perform the CDCVM, triggering, by the terminal, the POS to perform a Try Again procedure, and triggering the CDCVM to be performed.

According to the foregoing solution, when the POS performs the Try Again procedure, the POS returns again to a state of waiting to read a card after the transaction preprocessing, and the terminal performs the CDCVM. After the terminal completes the CDCVM, and after the first NFC application records a result that the CDCVM is already performed, the user enables the terminal to get close to the POS. After establishing the NFC radio frequency connection to the terminal, the POS resends the first service instruction, and performs NFC application selection. By comparing the first service instruction and the first comparison relationship, the card management unit in the terminal still selects the first NFC application to perform the first transaction. In this case, the terminal already performs the CDCVM. Therefore, the card management unit can directly send the first service instruction to the first NFC application, and the first NFC application then performs the first transaction.

In a possible design, the triggering, by the terminal, the POS to perform a Try Again procedure may specifically be implemented in the following manners: sending, by the card management unit, the first service instruction to the first NFC application; sending, by the first NFC application to the POS, the first response message to the first service instruction; receiving, by the first NFC application, a third service instruction sent by the POS, where the third service instruction is used to perform initial transaction processing; obtaining, by the card management unit, a third response message of the first NFC application to the third service instruction; determining, by the card management unit, whether the third response message includes a designated status word, where the designated status word is used by the card management unit to determine whether the POS supports the CDCVM, and if the third response message includes the designated status word, instructing, by the card management unit, the NFC controller to send the third response message to the POS, to trigger the POS to perform the Try Again procedure; or if the third response message does not include the designated status word, holding back, by the card management unit, the third response message or instructing, by the card management unit, the NFC controller to hold back the third response message, to trigger the POS to perform the Try Again procedure.

According to the foregoing solution, a specific solution in which the terminal triggers the POS to perform the Try Again procedure is provided.

In a possible design, before the selecting, by the terminal, a first NFC application corresponding to the POS, and performing the first transaction when a use condition of the first NFC application is already satisfied, the method further includes: receiving, by the NFC controller, a first message sent by the card management unit, where the first message is used to instruct the NFC controller to send a received service instruction to the card management unit.

In a possible design, before the establishing, by a terminal, a near field communication NFC radio frequency connection to a point of sale POS POS, the method further includes: receiving, by the terminal, an instruction in which a user selects a third NFC application; and after the establishing, by a terminal, an NFC radio frequency connection to a POS, the method further includes: if the third NFC application matches the type of the POS, selecting, by the terminal, the third NFC application, and performing the first transaction when a use condition of the third NFC application is already satisfied.

According to the foregoing solution, user use conditions in different scenarios can be satisfied, and the first transaction presently initiated by the POS is performed by using, in priority, the third NFC application manually selected by the user.

In a possible design, the use conditions respectively corresponding to the plurality of NFC applications include one or more of the following information, identity verification requirements respectively corresponding to the plurality of NFC applications; access control policies respectively corresponding to the plurality of NFC applications; and user use policies and policy enforcement conditions both respectively corresponding to the plurality of NFC applications.

In a possible design, the first NFC application is an NFC application installed in an SE, or the first NFC application is an NFC application installed in a TEE, or the first NFC application is an NFC application installed in an REE.

According to the foregoing solution, that the first transaction is performed by first NFC applications stored in different NFCEE may be implemented.

According to a second aspect, a terminal is provided in an embodiment of this application. The terminal has a function of implementing technical solutions in the foregoing first aspect and various possible designs of the first aspect. The function may be implemented by hardware, or may be implemented by hardware by executing corresponding software. The hardware or the software includes one or more modules corresponding to the foregoing function.

In a possible design, the terminal includes a processing unit and a communications unit. The processing unit may be, for example, a processor. The communications unit may be, for example, a transceiver, and the transceiver may include a radio frequency circuit. The processing unit is configured to perform the processing operations in the terminal transaction method provided in the first aspect and various possible designs of the first aspect. The communications unit is configured to perform data interaction with another device (such as a POS).

In another possible design, the terminal includes a processor and a memory. The memory is configured to store a program. The processor is configured to invoke the program stored in the memory, to implement the terminal transaction method provided in the first aspect and any one of possible designs in the first aspect. It should be noted that the processor can send or receive data through an input/output interface, a pin, a circuit, or the like. The memory may be a register, a cache, or the like in a chip. In addition, the memory may further be a storage unit located in the terminal and outside the chip, for example, a read-only memory (ROM), a static storage device of another type that can store static information and a static instruction, or a random access memory (RAM).

The foregoing processor described in any statement may be a general central processing unit (CPU), a microprocessor, an application-specific integrated circuit (SIC), or one or more of integrated circuits configured to control a program performing the terminal transaction method according to the first aspect or any one of possible designs of the first aspect.

According to a third aspect, an embodiment of this application further provides a computer-readable storage medium. A program is stored in the computer-readable storage medium. When run on a computer, the program enables the computer to perform the method according to the foregoing aspects.

According to a fourth aspect, in this application, a computer program product including a program is further provided. When the program is run on a computer, the computer is enabled to perform the method according to the foregoing aspects.

In addition, for technical effects of any one of the possible design manners of the second aspect to the fourth aspect, refer to technical effects of different design manners of the first aspect. Details are not described herein again.

DESCRIPTION OF EMBODIMENTS

Figure 1:
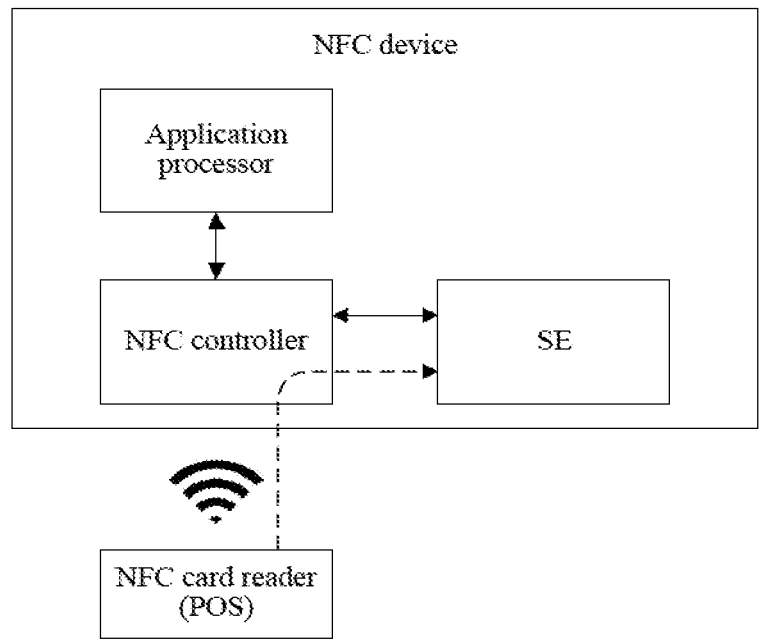
FIG. 1 is a schematic diagram of a mobile payment manner according to an embodiment of this application.

To make the objectives, technical solutions, and advantages of this application clearer, the following further describes this application in detail with reference to the accompanying drawings.

In embodiments of this application, a terminal transaction method and a terminal are provided and used to resolve a problem existing in the prior art that an NFC application does not match a type of a POS, and there is relatively poor user experience. The method and the apparatus are conceived based on a same invention concept. The method and the apparatus have similar principles for resolving the problem. Therefore, for implementation of the apparatus and the method, refer to each other, and details of repeated parts are not described.

The following describes basic concepts related in this application. It should be noted that, the explanations are intended to facilitate understanding of the embodiments of this application, but should not be construed as limiting the protection scope required by the embodiments of this application.

I. NFC

An NFC technology is a RFID-based short-range wireless connection technology, and can implement near field communication between electronic devices by using a magnetic field induction. Users can safely and rapidly exchange information or perform a transaction merely by enabling devices to touch or be close to each other.

An NFC device usually works on a frequency of 13.56 MHz. An effective communication range of the NFC device is 0 to 20 cm, and a typical value is 4 cm.

Usually, a work mode of an NFC device (that is, a role that the NFC device plays in NFC communication) can be classified into three types:

1. A peer-to-peer (P2P) mode. In this case, the NFC device is used for scenarios such as contact card sharing, network page sharing, NFC Bluetooth pairing, and Wireless Fidelity (Wi-Fi) pairing.

2. A card emulation (CE) mode. In this case, the NFC device is emulated as a contactless card, such as a door control card, a bank card, a bus card, a coupon, or an identity card. The card emulation mode is mainly used in contactless mobile payment scenarios, such as in a shopping mall, and in traffic.

3. A reader/writer (R/W) mode. In this case, the NFC device serves as a read/write terminal of a smart card, serves as a bank POS machine, a bus POS machine, or the like in the scenarios such as mobile payment or identity verification, or serves as a tag reader/writer.

II. NFC Controller

An near field communication controller (NFCC) is responsible for physical data transmission through a radio frequency (RF) interface and an antenna, to implement communication between an NFC device and a peer device. That is, communication between the NFC device and the peer device needs to be implemented by using the NFC controller.

In the NFC device, a hardware entity corresponding to the NFCC is usually an NFC chip.

The NFCC is a term used in the NFC controller interface (NCI) standard carried out by the NFC Forum (NFC Forum), and can correspond to a contactless front-end (CLF) in the Host Controller Interface (HCI) Standard carried out by the European Telecommunication Standards Institute (ETSI).

III. POS

A POS in the embodiments of this application may be understood as a POS supporting NFC. For example, the POS in the embodiments of this application includes but is not limited to a bank POS machine, a bus POS machine, and a door control POS machine. The POS is a multifunctional terminal. A POS installed on a special nominated merchant or an admissible network is networked with a computer. By using communication between the POS and an NFC device, functions, such as consumption, pre-authorization, balance inquiry, and transfer can be implemented.

Usually, there are two manners for initiating a transaction by an NFC device: an active card selection transaction, and a rapid card swiping transaction.

The active card selection transaction means that when a user needs to perform a transaction, a wallet application is actively enabled, and a card application used in a present transaction is selected. If the card application requires identity verification, the user performs the verification based on prompts. After the verification succeeds, the POS and the NFC device communicate and complete the transaction.

The rapid card swiping transaction means that the NFC device awakes a default wallet application in a manner of directly touching the POS. The default wallet application determines whether to perform identity verification based on a use condition of a default card application, and activates the default card application based on a verification result to communicate with the POS, so that the transaction is completed.

IV. Wallet application and NFC application

The wallet application is installed in an NFC device, is responsible for activation and management of an NFC application, and provides a visual user interface (UI) for a user. The NFC application (which may be alternatively referred to as a "card application") may be considered as an entity implementing contactless transaction logic. The NFC application is usually stored in a near field communication execution environment (NFCEE), such as a secure element (SE), a Trusted Execution Environment (TEE) or a rich execution environment (REE).

For example, a pay application (such as a Huawei wallet) downloaded in a mobile phone may be understood as a wallet application. By using the wallet application, a user binds and loads a card used for payment. The loaded card may be understood as the card application, and data (program code and personal data) of the card is stored in the NFCEE.

V. NFCEE

As described above, the NFC application is usually stored in the SE, TEE, or REE. The described SE, TEE, or REE herein may all be understood as NFCEE. A physical entity corresponding to the SE includes but is not limited to an embedded secure element (eSE), a universal integrated circuit card (UICC), and an inSE integrated in a main chip. A physical entity corresponding to the TEE or the REE includes but is not limited to chips having a calculation processing capability, such as a central processing unit (CPU), an ARM processor, and an application processor (AP). In the foregoing chips having the calculation function, two areas of the REE and the TEE are divided. Access control is implemented in software and hardware configuration manner, so that a safer naming space is provided for an NFC application in the TEE.

When an NFC device is in a card emulation work mode, there are usually two mobile payment manners: SE-based mobile payment and HCE-based mobile payment.

1. SE-Based Mobile Payment

For an SE-based mobile payment manner, refer to FIG. 1. In this case, an NFC application is stored in an SE. Therefore, information of the NFC application is isolated from an operating system (OS). After receiving a service instruction sent by an NFC card reader (a POS), an NFC controller routes the service instruction to the SE, and a corresponding NFC application stored in the SE performs a mobile payment transaction.

2. HCE-Based Mobile Payment

Figure 2:
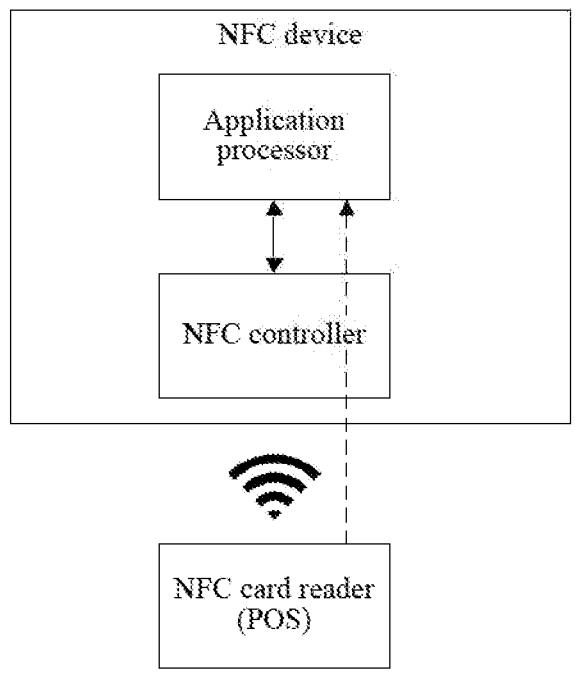
FIG. 2 is a schematic diagram of another mobile payment manner according to an embodiment of this application.

To avoid restraints from a card issuer, and meet a requirement of rapidly deploying an NFC application, a HCE-based mobile payment technology appears. For the HCE-based mobile payment manner, refer to FIG. 2. In this case, the NFC application is stored in the TEE or the REE. Without requiring the SE, in the HCE-based mobile payment technology, an NFC controller may route a service instruction sent by an NFC card reader (a POS) to the chip having the calculation processing capability, such as the application processor (AP), and an operating system notifies the service instruction to the NFC application. Compared with the SE-based mobile payment manner, the HCE-based mobile payment can enable any application program in the NFC device to be capable of being emulated as a contactless card to directly communicate with the NFC card reader (the POS).

Lacking in a protection from an entity SE, the HCE-based mobile payment manner can ensure payment security with reference to another security hardening solution. TEE, a HCE-based mobile payment, which is a currently common solution. The TEE is an execution environment that coexists in the NFC device with the REE. Supported by hardware, the TEE can implement a running mechanism isolated from the REE. The TEE has its own running space and defines a strict protective measure, so that a level of assurance of the TEE is higher than that of the REE. Only authorized application can be performed in the TEE. Confidentiality of an asset (such as, data or software) in the TEE is well protected, and can be protected from a software attack and against a security threat of a specific type.

VI. Consumer Device Cardholder Verification Method (CDCVM).

A CDCVM is a particular cardholder verification method (CVM) when an NFC device initiates a transaction. Usually, the CVM is a traditional verification manner, such as an online PIN or a user signature. The CDCVM means an Access PIN (a password of a wallet application), biological verification (such as verification of fingerprints, irises, or the like), or some verification manners, such as signature verification, performed based on a wearable device.

For example, when the transaction is performed, if a user performs fingerprints verification on the NFC device, and finds that a peer POS also supports the CDCVM, an NFC application, in the NFC device, may modify a parameter of the NFC application (such as a card transaction attribute, or a card verification result), simultaneously sets identification information in which the CDCVM has already been performed and the CDCVM already succeeds, and sends the identification information to the POS. In this case, a result of the fingerprint verification serves as a cardholder verification result. The present transaction does not need the user to perform identity verification again in the traditional manner (for example, providing an online PIN on a POS machine or a user signature on a POS machine), thereby leading to relatively great user experience.

VII. Try Again Procedure

In a contactless transaction, a naming procedure of a POS is approximately classified into four stages: transaction pre-processing (pre-processing), protocol activation (protocol activation), application selection (application selection), and kernel activation and determining (kernel activation and determining).

In the transaction pre-processing, the POS performs risk management and transaction attributes configuration based on an amount of a present transaction. In the protocol activation, a radio frequency field on the POS is electrically activated on the POS, a user is prompted to enable a card to touch or get close to the POS/swipe a card, and the POS waits to read the card. In the application selection, after the user enables the card to touch or get close to the POS and the POS established a radio frequency connection to the card, the POS negotiates, by using a SELECT PPSE and a SELECT AID, with the card for an NFC application used for the transaction presently. In the kernel activation and determining, the POS provides its performance information and information of the present transaction to the selected NFC application. The NFC application then generates necessary ciphertext and signature, and returns, to the POS, transaction data and result as a response of an initial transaction processing process. Next, the POS obtains the transaction data and result. Finally, the POS may independently perform subsequent determining logic, integrate the transaction data and result to generate an online packet, and require a card issuer corresponding to the NFC application to authenticate the transaction.

However, in a contactless rapid card swiping transaction scenario (such as a qPBOC), a requirement for a transaction latency is relatively high (within a range of 300 ms to 500 ms). If a user enables a card to touch or get close to the POS or swipe a card when an NFC device displays a black screen or a lock screen or when the user does not manually select the NFC application used in the present transaction, in this case, because a CDCVM has a relatively long execution time, if a verification link of a terminal end is directly added in the foregoing last two stages, satisfying a latency requirement is usually difficult. Therefore, there is a case of a timeout transaction. Once determining that the transaction is time out, the POS reports that the present transaction has an error. In this case, a cashier needs to enter a transaction amount again, and performs the foregoing transaction pre-processing and subsequent procedures again.

A POS (which supports the CDCVM function) may resolve, by using a Try Again procedure, the foregoing problem of a timeout transaction when the CDCVM is performed. The NFC application may enable the response of the initial transaction processing process to carry a status word "6986", and the status word indicates that the card application supports the CDCVM while a terminal has not performed the CDCVM. After parsing out the status word, the POS triggers the Try Again preset logic procedure: The POS returns to the protocol activation stage again to wait for reading a card. After the NFC device completes the CDCVM, and the NFC application records a result that the CDCVM is already performed, the user enables the NFC device to get close to the POS for performing the transaction. After establishing the radio frequency connection to a user terminal, the POS performs the application selection and the initial transaction processing again. In the Try Again procedure, a problem that the transaction amount needs to be entered again because of the timeout transaction may be avoided in a dual-interactive manner.

The following describes an existing terminal transaction solution in detail.

Figure 3:
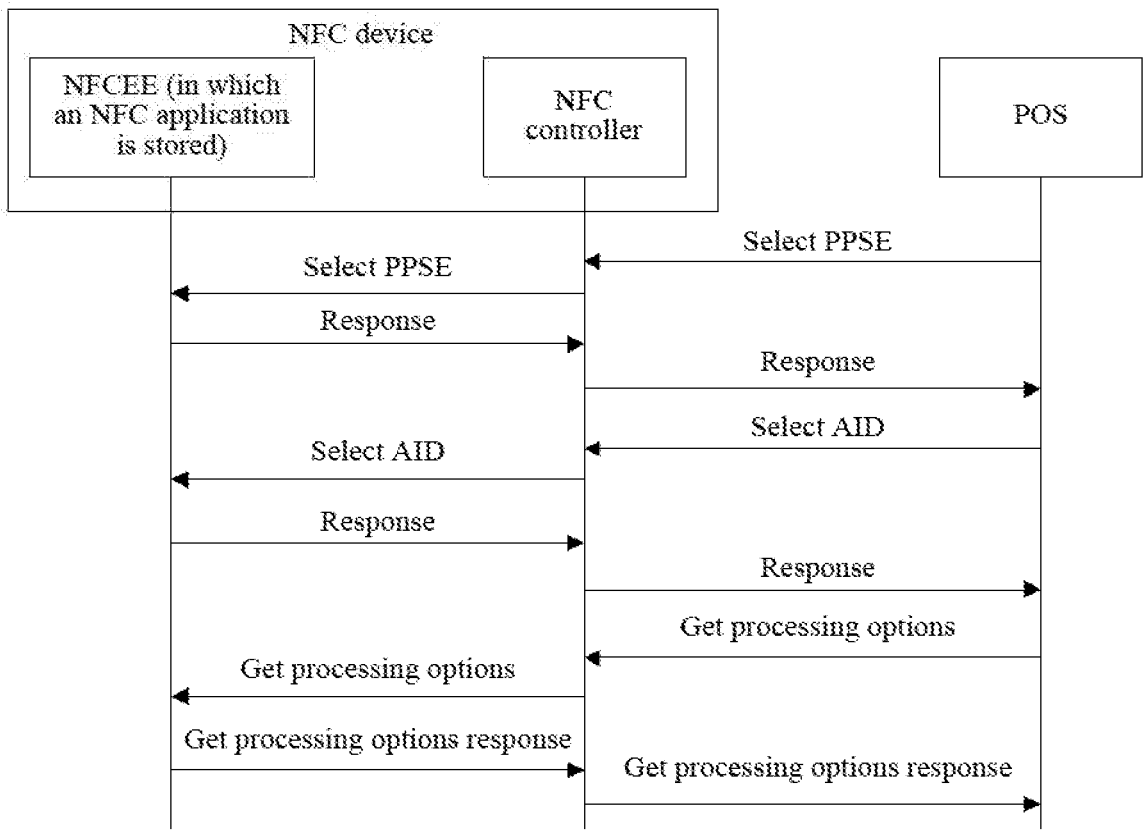
FIG. 3 is a schematic diagram of an interaction procedure between an NFC device and a POS according to an embodiment of this application.

With reference to FIG. 3, in the prior art, an interaction process between an NFC device and a bank card POS is completed by using three groups of instructions.

1. After an NFC device and a POS detect a peer device by using a radio frequency discovery process, the POS sends a SELECT PPSE (select PPSE) instruction to the NFC device, to instruct the NFC device to report an NFC application that can be used in a present transaction.

After receiving the SELECT PPSE (select PPSE) instruction, an NFC controller in the NFC device routes the SELECT PPSE (select PPSE) instruction to an NFCEE based on a routing entry configured to the NFC controller. A PPSE application in the NFCEE responds to the SELECT PPSE (select PPSE) instruction.

2. The PPSE application that is in the NFCEE and in the NFC device and that receives the instruction reports, by using a RESPONSE (response) message, a bank card NFC application that can be used in the present transaction.

A quantity of NFC applications reported by the NFC device may be a plurality of or may be one. Usually, in a default card swiping scenario, the NFC application reported by the NFC device is a default NFC application set by a user. That is, the RESPONSE (response) message sent in step 2 may include a list of a plurality of usable NFC applications. In addition, the NFCEE reports the RESPONSE (response) message by using the NFC controller.

3. If the default NFC application reported by the NFC device matches a type of the POS, the POS sends, to the NFC device, a SELECT AID (select AID) instruction including AID information of the default NFC application, to instruct the present transaction to be performed by using the default NFC application.

After receiving the SELECT AID (select AID) instruction, the NFC controller in the NFC device routes the SELECT AID (select AID) instruction to the NFCEE. The default NFC application in the NFCEE responds to the SELECT AID (select AID) instruction.

4. After receiving the SELECT AID (select AID) instruction, the NFC device indicates, by using the RESPONSE (response) message, that the default NFC application is successfully selected.

The NFC device may send the RESPONSE (response) message by using the NFC controller.

The RESPONSE message sent in step 4 may include file control information (FCI) of the default NFC application, an identification of the default NFC application, and a status word of a response result of the default NFC application to the SELECT AID (select AID) instruction.

5. The POS sends a get processing options (GPO) instruction to the NFC device, and provides performance information of the POS and a condition of the present transaction to the default NFC application.

After receiving the GPO instruction, the NFC controller in the NFC device routes the GPO instruction to the NFCEE. The default NFC application in the NFCEE responds to the GPO instruction.

6. The default NFC application generates necessary ciphertext and signature, and returns transaction data and result by using a GPO RESPONSE (get processing options response) message.

The NFC device may send the GPO RESPONSE (get processing options response) message by using the NFC controller.

In addition, if the default NFC application does not match the type of the POS, that is, the NFC device cannot respond to the SELECT PPSE, or NFC application information included in the response of the SELECT PPSE is null, the POS displays a message that the NFC application selection fails, and the transaction is finished.

After an NFC application is set as the default NFC application and activated, the NFC device performs routing information configuration of the NFCC, to instruct the NFC controller to route a service instruction, sent by the POS, to an NFCEE (such as an SE, a TEE, or a REE) that stores the NFC application. The routing information usually exists in a form of AID|NFCEE ID, where the AID is an index entry, and the NFCEE ID is a result entry. After receiving the SELECT AID service instruction sent by the POS, the NFC controller obtains through indexing the NFCEE ID based on AID information and routing information that are in the SELECT AID instruction, and routes the service instruction to an NFCEE indicated by the NFCEE ID. The NFCEE is the NFCEE in which the default NFC application is stored.

In addition, the routing information may farther include a use condition of the NFC application, for example, whether the NFC application can be used in a screen-on condition, whether the NFC application can be used in a screen-off condition, or whether the NFC application can be used in a power-off condition. Before routing the service instruction to the NFCEE based on the routing information, the NFC controller further needs to determine the use condition of the NFC application, and routes the service instruction to the NFCEE storing the NFC application only when the use condition is satisfied. However, the routing information does not include an identity verification requirement of the NFC application. Identity verification logic of the NFC application is implemented by a wallet application that manages the NFC application.

It should be noted that in the method shown in FIG. 3, the SELECT PPSE, the SELECT AID, and the RESPONSE may be considered as interaction instructions in the application selection stage during an interaction process between the NFC device and the POS. The GPO, and the GPO RESPONSE may be considered as interaction instructions of the initial transaction processing stage during the interaction process between the NFC device and the POS.

It should also be noted that the SELECT PPSE, and the RESPONSE are necessary in some scenarios, but not necessarily need to be performed in some scenarios. For example, in a bank card payment scenario, the NFC device and the POS usually need to perform instruction interaction between the SELECT PPSE and the RESPONSE. For the POS, a quantity of NFC applications that match the type of the POS may be a plurality of Therefore, the POS needs to obtain, by using the instruction interaction between the SELECT PPSE and the RESPONSE, NFC applications that are in the NFC device and that can be used to perform a transaction. The POS and the NFC device then negotiate and determine only one NFC application used for the present transaction, and select the NFC application by using the SELECT AID instruction. However, in some scenarios, there is only one NFC application that matches the type of the POS. Therefore, the POS can directly send the SELECT AID instruction, to indicate which NFC application is selected to perform the present transaction. For example, in a scenario such as swiping a bus card or opening door under door control, the NFC controller and the POS usually do not need to perform the instruction interaction between the SELECT PPSE and the RESPONSE. For the POS, a quantity of NFC applications (card applications) that match the type of the POS are usually only one. Therefore, the POS can directly instruct, by using the SELECT AID instruction, the NFC application (a card application) used in the present invention.

In an existing implementation, a bank card application usually requires to perform user identity verification on a terminal, while applications such as a bus card application, a door control card application, and a member card application can be directly used. When a routing mechanism of an existing NFCC is designed, an actual requirement in a service level is not considered. A problem of timeout occurs easily if being in a case in which after receiving a service instruction (such as the SELECT PPSE instruction or the SELECT AID instruction), the NFCC determines whether a corresponding application needs to perform identity verification, and performs an identity verification procedure after determining that the identity verification is required. One resolving method is: By using a mechanism of setting the default NFC application, a wallet application that manages the default NFC application determines whether performing the identity verification is required, and performs corresponding logic for the setting of the default NFC application: If the default NFC application is an NFC application, such as a bank card application, that requires to perform the identity verification, the NFCC notifies the wallet application when entering a radio frequency field, and the wallet application performs user identity verification. After the verification succeeds, the wallet application instructs the NFCC to establish a radio frequency connection to the POS, and the NFCC receives and routes a service instruction (such as the SELECT PPSE instruction). Alternatively, if the default NFC application is an NFC application, such as a bus card application, that does not require to perform the identity verification, the NFCC directly establishes a radio frequency connection and receives a service instruction (such as the SELECT AID instruction).

According to the existing mechanism of setting the default NFC application, if determining is performed based on the mechanism of setting the default NFC application before the service instruction is received, a case in which the default NFC application does not match the type of the POS occurs, also merely implementing activating one NFC application in one wallet application. If determining is performed based on the service instruction after the service instruction is received, an existing procedure needs to be modified. The modification can resolve a problem that the NFC application does not match the type of the POS. However, a problem of timeout occurs if the NFCC or the POS is not modified based on the modification of the procedure. Based on the foregoing descriptions of existing implementations, in the terminal transaction method shown in FIG. 3, if the default NFC application does not match the type of the POS that initiates the present transaction (for example, when the default NFC application set by the user is a bus card application, and the POS that initiates the present transaction is a bank POS machine), the present transaction is finished, the user of the NFC device needs to manually select and activate another NFC application that matches the type of the POS (and perform configuration of the NFCC in synchronization), and a POS end also needs to re-initiate a transaction, thereby causing relatively poor user experience.

In addition, in the method shown in FIG. 3, when the service instruction is routed, a problem of identity verification is not considered. For an NFC application, such as a bank card application, that always requires a terminal to perform the identity verification, the terminal transaction method shown in FIG. 3 has following problems during an identity verification process of the terminal: If the default NFC application matches the type of the POS, a problem of timeout easily occurs when the identity verification is performed after the service instruction is routed to the NFCEE; or if an identity verification procedure is added into the solution shown in FIG. 3, the POS needs to be modified, and an existing POS possibly cannot be compatible. Therefore, according to the terminal transaction solution provided in the prior art, to satisfy the identity verification requirement of the NFC application is difficult.

To resolve a problem existing in the prior art that an NFC application does not match the type of the POS, and there is relatively poor user experience, in embodiments of this application, a terminal transaction method and a terminal are provided.

The following specifically describes the terminal transaction solution provided in the embodiments of this application with reference to accompanying drawings. It should be noted that, "a plurality of" related in the embodiments of this application means two or more. In addition, It should be understood that, in descriptions of the embodiments of this application, terms such as "first" and "second" are merely used for purposes of distinguishing descriptions and are neither intended to indicate or imply relative importance nor intended to indicate or imply a sequence.

Figure 4:
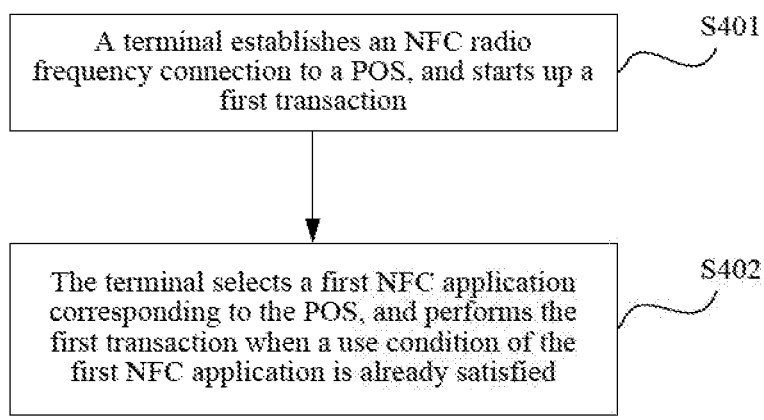
FIG. 4 is a schematic flowchart of a first terminal transaction method according to an embodiment of this application.

FIG. 4 is a schematic flowchart of a terminal transaction method according to an embodiment of this application. The method includes the following steps:

S401. A terminal establishes an NFC radio frequency connection to a POS, and starts up a first transaction.

That "a terminal establishes an NFC radio frequency connection to a POS" may be understood as the following: A user enables the terminal to touch or get close to the POS (which is in a power-on/protocol activation state), so that the terminal establishes the NFC radio frequency connection to the POS in an effective communication range (such as, 0 to 20 cm). That is, that "a terminal establishes an NFC radio frequency connection to a POS" does not limit the terminal and the POS to having actual physical contacts.

A terminal in the embodiments of this application may be understood as a terminal supporting NFC, that is, may be understood as the foregoing NFC device. The terminal includes but is not limited to a smartphone, a smartwatch, a tablet, a virtual reality (virtual reality, VR) device, an augmented reality (AR) device, a personal computer, a handheld computer, and a personal digital assistant.

S402. The terminal selects a first NFC application corresponding to the POS, and performs the first transaction when a use condition of the first NFC application is already satisfied.

The term "corresponding" has two meanings: 1. The first NFC application is an NFC application that matches a type of the POS. 2. The first NFC application is an NFC application that is negotiated and selected by the terminal based on its interaction with the POS and that is used to perform the first transaction.

It can be known that different from the prior art, the first NFC application used to perform the first transaction in this embodiment of this application is not determined in a manner of setting a default NFC application, but is determined through negotiation between the terminal and the POS after the first transaction is started up.

It should be noted that there may be a plurality of NFC applications that match the type of the POS and that are installed in the terminal, and the first NFC application is merely one of the plurality of NFC applications.

In embodiments of this application, a transaction type of the first transaction is not specifically limited. For example, when the terminal touches a bus POS machine, the initiated first transaction may be a transaction of swiping a bus card. When the terminal touches a bank POS machine, the initiated first transaction may be a bank card payment transaction.

In addition, the first NFC application in S402 may be an NFC application installed in an SE, or may be an NFC application installed in a TEE, or may be an NFC application installed in an REE. This is not limited in this embodiment of this application. That is, the first NFC application selected by using the terminal transaction method shown in FIG. 4 may be an NFC application installed in any NFCEE in the terminal.

In specific implementation, in S402, that the terminal selects a first NFC application corresponding to the POS, and performs the first transaction when a use condition of the first NFC application is already satisfied may specifically be implemented in the following manners: An NFC controller in the terminal receives a first service instruction sent by the POS; the NFC controller sends the first service instruction to a card management unit in the terminal; the card management unit selects, based on the first service instruction and the first comparison relationship, the first NFC application that corresponds to the POS and that is in a plurality of NFC applications; and if a use condition of the first NFC application is already satisfied, the first NFC application receives the first service instruction, and performs the first transaction based on the first service instruction.

The first comparison relationship and use conditions respectively corresponding to the plurality of NFC applications in the terminal are stored in the card management unit. The first comparison relationship is used to indicate one-to-one correspondences between the plurality of NFC applications and a plurality of service instructions. The first NFC application is one of the plurality of NFC applications.

In the implementation of S402, the first service instruction is used for the terminal to determine the first NFC application corresponding to the POS. For example, the first service instruction may be the foregoing SELECT AID instruction. For example, when a bus POS machine initiates a transaction, a first service instruction sent by the bus POS machine to the terminal may be the SELECT AID instruction. Certainly, the first service instruction in the embodiments of this application is not limited as the SELECT AID instruction. An instruction sent by the POS to the terminal, used to initiate the first transaction, and that can directly or indirectly indicates an NFC application used for the first transaction can be considered as the first service instruction in the embodiments of this application.

Figure 5:
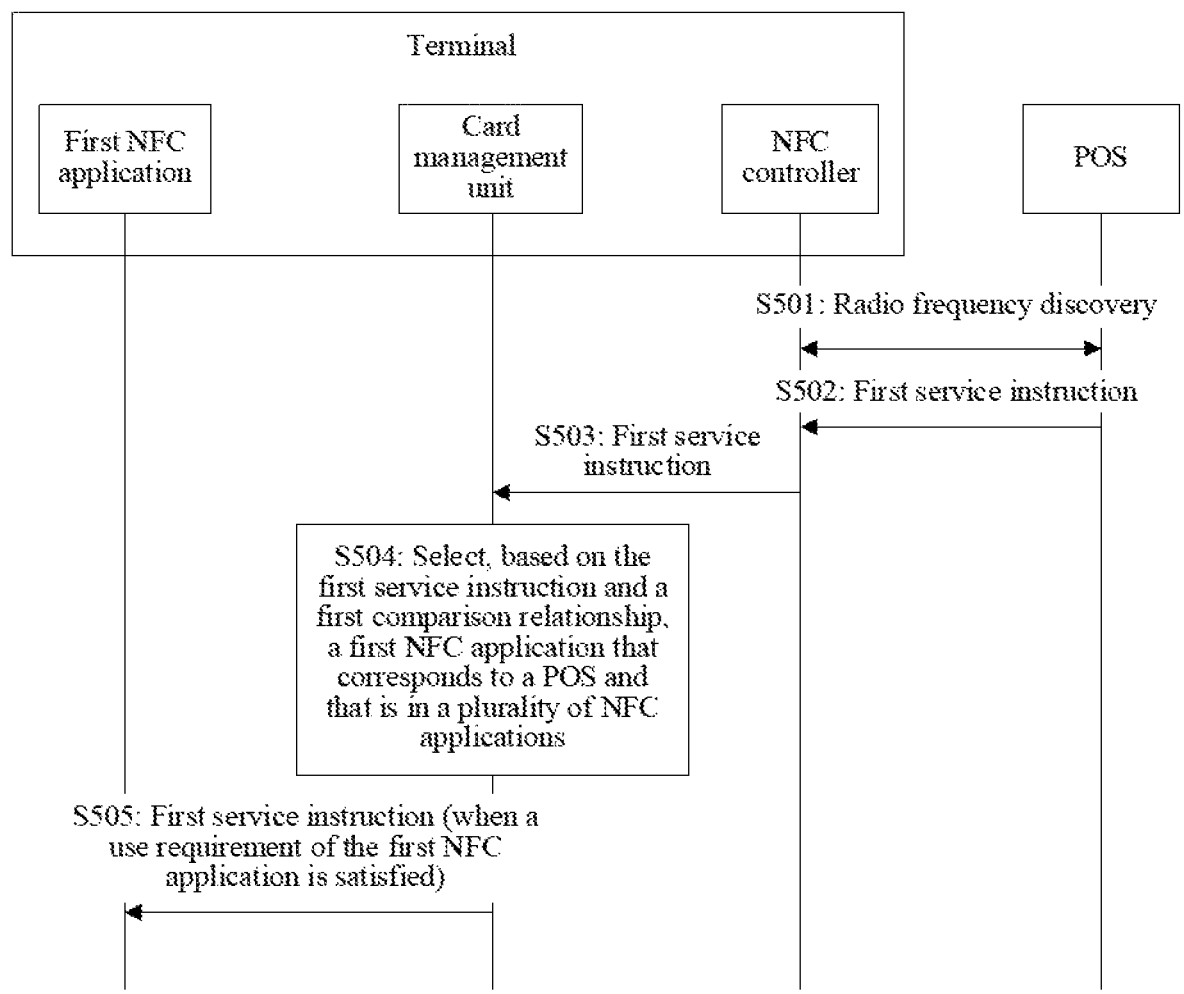
FIG. 5 is a schematic flowchart of a second terminal transaction method according to an embodiment of this application.

Based on the implementation of the foregoing S402, a specific implementation of the terminal transaction method shown in FIG. 4 may be shown in FIG. 5. The terminal transaction method shown in FIG. 5 includes the following steps.

S501. The terminal establishes NFC communication with the POS by using a radio frequency discovery.

Herein, a radio frequency discovery process may be implemented in a manner in which the terminal touches the POS in S401. When the terminal establishes the NFC communication with the POS by using the radio frequency discovery process, the POS may send the first service instruction to the terminal, to initiate the first transaction.

S502. The NFC controller in the terminal receives the first service instruction sent by the POS.

For the first service instruction, refer to the foregoing description. Details are not described herein again.

S503. The NFC controller sends the first service instruction to the card management unit in the terminal.

As described above, the first comparison relationship and the use conditions respectively corresponding to the plurality of NFC applications in the terminal are stored in the card management unit, the first comparison relationship is used to indicate one-to-one correspondences between the plurality of NFC applications and the plurality of service instructions, and the first NFC application is one of the plurality of NFC applications.

S504. The card management unit selects, based on the first service instruction and the first comparison relationship, the first NFC application that corresponds to the POS and that is in the plurality of NFC applications.

In the embodiments of this application, the card management unit may be considered as a module in an operating system of the terminal, and the first comparison relationship and the use conditions respectively corresponding to the plurality of NFC applications in the terminal are stored in the card management unit. By using the card management unit, an NFC application corresponding to the POS may be selected for a transaction initiated by the POS. An NFCEE that stores the NFC application may be a plurality of types, for example, may be the SE, the TEE, and the REE.

The first comparison relationship is used to indicate one-to-one correspondences between the plurality of NFC applications and the plurality of service instructions. The card management unit may determine, based on the first service instruction and the first comparison relationship, the first NFC application that corresponds to the POS that initiates the first transaction.

In S504, that the first NFC application corresponding to the POS is determined based on the first service instruction and the first comparison relationship may be implemented in the following two manners.

A First Manner:

In a first manner, the first comparison relationship is used to indicate a comparison relationship between AID information of the first service instruction and the NFC application. After receiving the first service instruction, the card management unit parses out the AID information carried in the service instruction, compares the AID information obtained through parsing and the first comparison relationship, and determines the first NFC application corresponding to the POS.

For example, three NFC applications, a bus card application, a bank card application 1, and a bank card application 2, are installed in the terminal. The first comparison relationship is used to indicate three groups of comparison relationships, the bus card application↔A00000000386980701, the bank card application 1↔A0000000333010102, and the bank card application 2↔A000000333010101. The A00000000386980701, A000000333010102, and A000000333010101 all indicate AID information. When a bank POS machine initiates a bank card payment transaction, after receiving a SELECT PPSE instruction sent by the POS, the card management unit reports the bank card application 1 and the bank card application 2 to the POS by using a RESPONSE message. After receiving the RESPONSE message, the POS sends a SELECT AID instruction to the NFC controller in the terminal, to instruct the bank card application 1 to be selected to perform the present transaction. After receiving the SELECT AID instruction sent by the NFC controller, the card management unit parses out AID information carried in the SELECT AID instruction as the A000000333010102, compares the AID information obtained through parsing and the first comparison relationship, and determines that an NFC application corresponding to the POS is the bank card application 1. Therefore, the present transaction may be performed by using the bank card application 1.

A Second Manner:

In a second manner, the first comparison relationship is used to indicate a comparison relationship between the service instruction and the NFC application. The card management unit compares the received first service instruction and the first comparison relationship, and determines an NFC application corresponding to the POS.

For example, four NFC applications, an application 1, an application 2, an application 3, and an application 4, are installed in the terminal. The first comparison relationship is used to indicate four groups of comparison relationships, the application 1 ↔ a service instruction A, the application 2 ↔ a service instruction B, the application 3 ↔ a service instruction C, and the application 4 ↔ a service instruction D. If the first service instruction sent by the NFC controller and received by the card management unit is the service instruction B, the card management unit may select, based on the first comparison relationship and the service instruction B, the application 2 corresponding to the POS. Therefore, the present transaction may be performed by using the application 2.

S505. If the use condition of the first NFC application is already satisfied, the first NFC application receives the first service instruction, and performs the first transaction based on the first service instruction.

In the embodiments of this application, the use conditions respectively corresponding to the plurality of NFC applications may include one or more of the following information: identity verification requirements respectively corresponding to the plurality of NFC applications; access control policies respectively corresponding to the plurality of NFC applications; and user use policies and policy enforcement conditions both respectively corresponding to the plurality of NFC applications.

The following describes the identity verification requirement, the access control policy, the user use policy, and the policy enforcement condition in detail.

I. Identity Verification Requirement

An identity verification requirement of an NFC application may be understood as a policy indicating before the NFC application performs the first transaction, whether identity verification needs to be performed, and in which manner the identity verification is performed. For example, the identity verification requirement of the NFC application indicates that the NFC application needs to perform the identity verification. Therefore, a transaction cannot be successfully performed by using the NFC application when the identity verification is not performed on a terminal.

Further, if different identity verification manners correspond to different levels of assurance, the identity verification requirement may indicate a level of assurance of the identity verification required by the NFC application. For example, a security manner A corresponds to a level 1 of assurance, and a security manner B corresponds to a level 4 of assurance. When the identity verification requirement indicates that the NFC application requires identity verification with a level, more than 3, of assurance, in this case, the identity verification may be performed in the verification manner B, so that the identity verification requirement of the NFC application is reached.

For example, a case in which a watch and a mobile phone are in a security range can serve as an identity verification manner. A level of assurance of the identity verification manner is lower than a level of assurance of a fingerprint verification manner. An identity verification requirement of an NFC application may further indicate that a level of assurance of identity verification required by the NFC application is higher than the level of assurance of the manner in which identity verification is performed based on a security range.

For example, identity verification performed in different environments corresponds to different levels of assurance. For example, a level of assurance of identity verification in the SE is higher than a level of assurance of identity verification in the TEE, and a level of assurance of identity verification in the TEE is higher than a level of assurance of identity verification in the REE. In this case, an identity verification requirement of an NFC application may further indicate that a level of assurance of identity verification required by the NFC application is higher than the level of assurance of the manner in which identity verification is performed in the TEE.

For example, actual usage environments of the NFC application correspond to different levels of assurance. For example, a level of assurance of a usage environment when a transaction is performed in a common site and non-working hours is higher than a level of assurance of a usage environment when a transaction is performed in a non-common site and working hours. An identity verification requirement of an NFC application may indicate that a level of assurance of identity verification required by the NFC application is higher than the level of assurance of the usage environment when the transaction is performed in the non-common site and working hours. In this case, identity verification may be performed in the usage environment of the common site and non-working hours, so that the identity verification requirement of the NFC application is reached.

II. Access Control Policy

An access control policy of an NFC application may be understood as a requirement of the NFC application when access to the NFC application is initiated before the NFC application performs the first transaction. For example, the access control policy of the NFC application may indicate a version limitation on the NFC application (or a wallet application managing the NFC application). If a requirement of the version limitation is unsatisfied, the access is rejected. The access control policy of the NFC application may indicate a limitation by the NFC application on a current login account of a wallet application (or an operating system) managing the NFC application. If the login account does not meet the requirement, the access is rejected. An access control policy of a door control card application may indicate that in a scenario of opening door under door control, the door control card application can be accessed only by a door control POS machine having a designated ID.

The access control policy of the NFC application may indicate that the NFC application can be accessed only after POS certificate verification succeeds. The access control policy of the NFC application may indicate another requirement of the NFC application for a terminal device, for example, whether the terminal is rooted. If the terminal is rooted, the access is rejected.

III. User Use Policy and Policy Enforcement Condition

A user use policy of an NFC application is a setting performed when the card management unit requires a user to sort priorities of a plurality of NFC applications in advance, to ensure that subsequent transaction procedures can be successfully performed when a case in which there are the plurality of NFC applications that match the type of the POS in a terminal is detected. A policy enforcement condition is a basis used to enable the terminal to determine, when a top priority application decided based on a user use policy collides with an NFC application selected during actual transaction, whether to perform the transaction or how to continue to perform the transaction.

For example, a user can set "When a bank card is swiped, perform a transaction by using a credit card furthest from a due date in priority" as a user use policy, and "Do not allow to perform the transaction by using a less priority card" as a policy enforcement condition. During the transaction, when determining, based on the SELECT PPSE instruction, that a current scenario is a scenario of swiping a bank card, the terminal sorts priorities of various credit card applications based on a current date and the user use policy, and returns information at least including information of an NFC application having a top priority to the POS. When an NFC application indicated by the POS by using the first service instruction is not the NFC application having the top priority and determined based on the user use policy, the terminal can reject the present transaction based on the policy enforcement condition.

For example, different merchants have different discounts for bank cards of different card issuers. A user use policy of a bank card application may be set based on discounts for a card issuer of the bank card application. When selecting an NFC application that matches the type of the POS, if the plurality of bank card applications all match the type of the POS, the card management unit may set a priority of a bank card application with a relatively great discount to be relatively high, and select the bank card application with a relatively high priority in priority to perform the present transaction.

For another example, if there are a plurality of bus card applications that match a type of a bus POS at a site in the terminal (AID information of two bus cards are the same, but the two bus card applications are respectively stored in the SE and the TEE), after detecting such a scenario that may cause collision in NFC application selection, the card management unit triggers the user to set a user use policy and a policy enforcement condition. The user may set "Use a bus card with more/less balance in priority" as the user use policy, and "Allow to use a less priority bus card" as the policy enforcement condition. In this way, after the terminal receives a first service instruction (SELECT AID instruction) sent by a bus POS machine, the card management unit may send, based on an indication of the user use policy, the first service instruction to a bus card application with a higher priority (for example, a bus card application stored in the SE) in priority, and perform a transaction again by using the less priority bus card application based on the policy enforcement condition when selection of the application with a higher priority fails or when the transaction fails.

Certainly, if there are a plurality of NFC applications that match the type of the POS when the card management unit selects an NFC application that matches the type of the POS, the card management unit may alternatively instruct the user to select one of the plurality of NFC applications as an application with a top priority to perform the transaction.

The following explains, by using a specific example, a use condition of an NFC application, and how the card management unit selects the NFC application corresponding to the POS with reference to the first service instruction and the use condition of the NFC application.

Assuming that there are a bank card application A, a bank card application B, a bus card application C, a bus card application D, and a door control card application E that are installed in a terminal. The bank card application A is installed in the SE, and an identity verification requirement of the bank card application A indicates that the terminal can successfully complete the transaction only after fingerprint verification is performed on the terminal. The bank card application B is stored in the TEE or the REE, and an access restrictions requirement of the bank card application B indicates that the terminal can directly access the bank card application B after the terminal is screen-on. An access restrictions requirement of the bus card application C indicates that the terminal (for all users) can directly access the bus card application C. An access restrictions requirement of the bus card application D indicates that a user can directly access the bus card application D by using a wallet application in the terminal or an operating system (in a user 1 login state) in the terminal. An access restrictions requirement of the door control card application E indicates that the door control card application E can be accessed only by a door control POS machine having a designated ID. For the five NFC applications installed in the terminal the bank card A and B both match a type of a bank POS and can perform a bank card transaction, and the bus card C and D are installed in different NFCEE but have same AID, and match the type of a bus POS. After detecting such a case, the card management unit triggers the user to set the following user use policies and policy enforcement conditions: When a transaction of swiping a bus card is performed, use a bus card application having more balance in priority (a user use policy), and allow to use a less priority bus card application (a policy enforcement condition). When a credit card payment transaction is performed, use a credit card application further from a due date in priority (a user use policy), and do not allow to use a less priority credit card application (a policy enforcement condition).

To clearly indicate use conditions of the five NFC applications, the use conditions of the foregoing five NFC applications are shown in a table form. For details, refer to the following Table 1.

TABLE 1

| | Bank card application A (credit card) | Bank card application B (credit card) | Bus card application C (AID 1) | Bus card application D (AID 1) | Door control card application E |
|---|---|---|---|---|---|
| Identity verification requirement | Needing fingerprint verification | Not needing fingerprint verification | Not needing fingerprint verification | Not needing fingerprint verification | Not needing fingerprint verification |
| Access restrictions requirement | Always accessible | Accessible after a terminal is screen-on | A terminal (for all users) can directly perform accessing | Accessible by a wallet application (in a user 1 login state) | Accessible only by a door control POS machine having a designated ID |
| User use policy and policy enforcement condition | Policy: During a credit card payment transaction, use a credit card application further from a due date in priority Performing condition: Do not allow to use a less priority card | | Policy: Use a bus card application having more balance in priority Performing condition: Allow to use a less priority card | | N/A (a case in which a plurality of NFC applications match a type of a door control POS does not exist in a terminal) |

There are the following scenarios when a transaction is performed by using the terminal.

Scenario 1:

The terminal in a screen-off state touches a door control card POS machine. The door control card POS machine sends a first service instruction (carrying an ID) to the terminal. After receiving the first service instruction, the card management unit determines an NFC application corresponding to the door control card POS machine, the door control card POS machine instructs the POS to select the door control card application E, and an ID of the door control card POS machine is the designated ID indicated by the use condition of the door control card application E. In this case, the card management unit sends the first service instruction to the door control card application E, and the door control card application E performs the present transaction.

Scenario 2:

The terminal in a screen-on state touches a bank card POS machine. The bank card POS machine sends a SELECT PPSE instruction to the terminal. After receiving the SELECT PPSE instruction, the card management unit determines that NFC applications that match a type of the bank card POS machine are the bank card application A and the bank card application B. With reference to a current date, a due date of the bank card application A is later than a due date of the bank card application B, so that the card management unit determines that the present transaction uses the bank card application A. A use condition of the bank card application A indicates that the terminal can access the bank card application A only after identity verification is performed on the terminal. Therefore, the card management unit needs to send a first service instruction again to the bank card application A after the identity verification is performed on the terminal, and the bank card application A performs the present transaction.

Scenario 3:

The terminal in a screen-on state enables a wallet application, and touches a bus card POS machine. The bus card POS machine sends a first service instruction to the terminal. After receiving the first service instruction, the card management unit determines that NFC applications corresponding to the bus card POS machine are the bus card application C and the bus card application D. The card management unit determines that a balance of the bus card application C is 45 yuan, and a balance of the bus card application D is 67 yuan. The user performs setting of using the bus card application with more balance in priority when a transaction of swiping a bus card is performed Therefore, the card management unit determines that the present transaction uses the bus card application D. The card management unit sends the first service instruction to the bus card application D.

In addition, all users can directly access the bus card application C, while only the user 1 can access the bus card application D. Therefore, if a login user in the terminal is user 2, the card management unit selects the bus card application C to perform the transaction although the balance of the bus card application D is greater than the balance of the bus card application C.

Scenario 4:

Apart from the foregoing scenarios, a POS may further send discount information and transaction amount information of a plurality of NFC applications (such as bank card applications), or a POS obtains, by using a second service instruction, a plurality of NFC applications installed in the terminal and performs sorting based on a discount amount of each NFC application, or the card management unit obtains discount information of bank cards through Internet or in another manner, and sorts priorities of the bank card applications based on discount amounts and merchant information sent by the POS. When returning the NFC application that matches the type of the POS to the POS, the card management unit may refer to the discount amount of each NFC application, and prefer an NFC application having a relatively great discount amount.

The foregoing four scenarios merely serve as a specific example. In actual implementation, there are a plurality of application scenarios. The card management unit may select the NFC application corresponding to the POS based on the first service instruction and/or a use condition of each NFC application to perform the first transaction.

In S505, the first NFC application receives the first service instruction. The first service instruction received by the first NFC application may be sent by the card management unit, or may be sent by the NFC controller. That is, before the first NFC application receives the first service instruction, and performs the first transaction based on the first service instruction, the card management unit sends the first service instruction to the first NFC application; or the card management unit instructs the NFC controller to send the first service instruction to the first NFC application. After receiving the first service instruction, the first NFC application responds to the first service instruction sent by the POS, to perform the first transaction.

That is, the first service instruction received by the first NFC application may be sent by the card management unit, or may be sent by the NFC controller instructed by the card management unit. In different implementation scenarios, any one of the two implementations may be used, and this is not specifically limited in the embodiments of this application. FIG. 5 merely shows the implementation in which the first service instruction is sent by the card management unit to the first NFC application.

When the first service instruction is sent by the card management unit to the first NFC application, an interaction process between the card management unit and the first NFC application may have a plurality of implementations. For example, the card management unit sends (for example, by using the HCI protocol based on which data is transmitted to the SE) the service instruction to an NFCEE storing the first NFC application, and the NFCEE is then responsible for distributing the service instruction to the first NFC application, and returns a response message sent by the first NFC application to the card management unit. For another example, a designated interface is disposed in the NFCEE storing the first NFC application, and the card management unit may directly interact with the first NFC application through the designated interface (such as a Client API in the TEE configured to visit a TA).

It should also be noted that in the terminal transaction method provided in the embodiments of this application, after the first service instruction is sent to the first NFC application, a process of the first NFC application performing the first transaction is the same as the process in the prior art. Therefore, in the embodiments of this application, a specific performing process of the first transaction is not described again.

In addition, in a process of selecting the first NFC application and subsequently performing the first transaction both by using the terminal transaction method provided in the embodiments of this application, interactions between the terminal and the POS are all performed by using the NFC controller. That is, the first NFC application, the card management unit, or another module or unit in the terminal does not directly send a response message to the POS, but sends the response message to the NFC controller, and then the NFC controller sends the response message to the POS. The POS also does not directly send a service instruction to the first NFC application, the card management unit, or another module or unit in the terminal, but sends the service instruction to the NFC controller, and the NFC controller sends the service instruction to the first NFC application, the card management unit, or the another module or unit in the terminal.

In addition, in some transaction scenarios (such as a bank card payment transaction), before the NFC controller in the terminal receives the first service instruction sent by the POS, the method further includes: receiving, by the NFC controller, a second service instruction sent by the POS; and sending, by the NFC controller, the second service instruction to the card management unit.

The second service instruction may be the foregoing SELECT PPSE instruction. When there are a plurality of NFC applications that match the type of the POS, the POS may select the first NFC application based on information carried in the second service instruction.

After receiving the second service instruction, the card management unit may determine, based on the second service instruction and a second comparison relationship, at least one NFC application that matches a type of the second service instruction and that is in the plurality of NFC applications. The second comparison relationship is used to indicate a matching relationship between the second service instruction and the plurality of NFC applications. Each NFC application in the terminal may indicate a type of the second service instruction that matches a type of each NFC application to the card management unit. The card management unit may generate the second comparison relationship based on types of the second service instruction that match the type of each NFC application.

After determining at least one NFC application that matches the type of the second service instruction, when a quantity of the at least one NFC application that matches the type of the second service instruction is a plurality of the card management unit may determine, based on the user use policy, priorities of the at least one NFC application, and responds to the second service instruction based on the priorities of the at least one NFC application. There are two processing manners about how to respond to the second service instruction:

I. The card management unit sends a second response message to the second service instruction to the POS. The second response message is used to indicate at least one NFC application that matches the type of the POS and that is in a plurality of NFC applications, so that the POS generates the first service instruction based on the second response message.

II. The card management unit sends the second service instruction to an NFCEE in which a designated NFC application in the at least one NFC application is located to perform processing, receives the second response message to the second service instruction, and sends the second response message to the POS, so that the POS generates the first service instruction based on the second response message. The second response message is used to indicate M NFC applications that are stored in the NFCEE and that match the type of the POS, where M is greater than or equal to 1, and the M NFC applications include the designated NFC application.

The designated NFC application may be an NFC application having a top priority in the at least one NFC application.

The following respectively introduces a first processing manner and a second processing manner in detail.

First Processing Manner:

Specifically, in the first processing manner, the second response message is constructed and sent by the card management unit based on the second comparison relationship. After receiving the second service instruction, the card management unit determines at least one NFC application that matches the type of the POS based on the second comparison relationship. If a quantity of the at least one NFC application are a plurality of, the card management unit may further sort priorities of the at least one NFC application based on user use policies of the at least one NFC application. The card management unit then sends the second response message to the POS, to indicate the at least one NFC application that matches the type of the POS and priorities sorting of the at least one NFC application.

Second Processing Manner:

Specifically, in the second processing manner, after receiving the second service instruction, the card management unit first determines the at least one NFC application that matches the type of the POS based on the second comparison relationship, then sorts a priority of the at least one NFC application based on a user use policy of the at least one NFC application, and sends the second service instruction to an NFCEE in which the NFC application with the top priority (that is, the designated NFC application) in the at least one NFC application is located. A related application (such as a PPSE application) in the NFCEE then responds to the second service instruction. Specifically, the second response message is used to indicate the M NFC applications that are stored in the NFCEE and that match the type of the POS, where M is greater than or equal to 1. It is not difficult to understand that the M NFC applications at least include the designated NFC application.

In addition, if a quantity of the M NFC applications are a plurality of (that is, there is another NFC application, other than the designated NFC application, that matches the type of the POS and that is stored in the NFCEE in which the designated NFC application is located), and the second response message may further include priorities sorting information of the M NFC applications.

It should be noted that in the second processing manner, the M NFC applications indicated by the second response message are NFC applications that match the type of the POS and that are stored in the NFCEE in which the designated NFC application is located. In the first processing manner, the at least one NFC application indicated by the second response message includes NFC applications that match the type of the POS and that are stored in all NFCEE in the terminal. That is, the quantity of the M NFC applications are less than or equal to the quantity of the at least one NFC application. For example, NFC applications that are stored in the REE and that match the type of the POS are an application 1 and an application 2, an NFC application that is stored in the TEE and that matches the type of the POS is an application 3, and NFC applications that are stored in the SE and that match the type of the POS are an application 4, an application 5, and an application 6. The application 5 is the NFC application having a top priority (that is, the designated NFC application) among six NFC applications that match the type of the POS. If the first processing manner is used, the second response message is used to indicate six NFC applications, the application 1, the application 2, the application 3, the application 4, the application 5, and the application 6, and priorities sorting information of the six NFC applications. If the second processing manner is used, the second response message is used to indicate three NFC applications, the application 4, the application 5, and the application 6, and priorities sorting information of the three NFC applications.

Whichever one in the foregoing two processing manners is used, the POS can obtain the NFC application that matches the type of the POS based on the received second response message. The POS then selects, based on its own capability, an NFC application used to perform the first transaction from the NFC applications indicated in the second response message, and sends the first service instruction to the terminal by performing S502, to indicate the NFC application selected by the POS. Usually, the POS selects, based on its own capability, an NFC application having a top priority from NFC applications mutually supported by two sides (the POS and the terminal).

After the card management unit in the terminal receives the first service instruction, based on different NFC applications indicated in the first service instruction, processing operations of the card management unit have the following two cases:

First Case:

In a first case, an NFC application indicated in the first service instruction is an NFC application having a top priority in NFC applications that match the type of the POS, and that are indicated in the second response message. After receiving the first service instruction, the card management unit may determine, based on the first service instruction, that the NFC application having the top priority is the first NFC application performing the first transaction, and sends the first service instruction to the first NFC application (or the NFCEE in which the first NFC application is located) when the use condition of the first NFC application is satisfied.

For example, in a scenario of swiping a bank card, the second response message sent by the terminal to the POS indicates that NFC applications that match a bank POS machine are a bank card application A, a bank card application B, and a bank card application C, and priorities sorting determined by the card management unit based on a user use policy is that the bank card application A>the bank card application B>the bank card application C. After receiving the second response message, the POS selects, based on its own capacity, the bank card application A used to perform the first transaction, and the POS instructs, by using the first service instruction, the terminal to select the bank card application A to perform the first transaction. After receiving the first service instruction, the card management unit determines that the bank card application A is the first NFC application used to perform the first transaction, and sends the first service instruction to the bank card application A (or the NFCEE in which the bank card application A is located).

Second Case:

In a second case, an NFC application indicated in the first service instruction is an NFC application having a less priority in NFC applications that match the type of the POS, and that are indicated in the second response message. After receiving the first service instruction, the card management determines that the NFC application indicated by the first service instruction is not an NFC application having a top priority. In this case, the card management unit needs to determine, based on the policy enforcement condition, whether a user allows to use the NFC application having the less priority to perform the first transaction. If the policy enforcement condition set by the user allows the first transaction to be performed by using the NFC application having the less priority, the card management unit enables the NFC application having the less priority indicated in the first service instruction to serve as the first NFC application performing the first transaction, and sends the first service instruction to the first NFC application (or the NFCEE in which the first NFC application is located) when the use condition of the first NFC application is satisfied. If the policy enforcement condition set by the user does not allow the first transaction to be performed by using the NFC application having the less priority, the first transaction finishes/fails, or the terminal prompts again the user to perform setting of the policy enforcement condition (that is, prompts the user to confirm again whether to allow the first transaction to be performed by using the NFC application having the less priority).

For example, in a scenario of swiping a bank card, the second response message sent by the terminal to the POS indicates that NFC applications that match a bank POS machine are a bank card application A, a bank card application B, and a bank card application C, and priorities sorting determined by the card management unit based on a user use policy is that the bank card application A>the bank card application B>the bank card application C. After receiving the second response message, the POS selects, based on its own capacity, the bank card application B used to perform the first transaction, and the POS instructs, by using the first service instruction, the terminal to select the bank card application B to perform the first transaction. After receiving the first service instruction, the card management unit determines that the bank card application B indicated by the first service instruction is not an NFC application having a top priority (the bank card application A). In this case, if the policy enforcement condition set by the user allows the first transaction to be performed by using the NFC application having the less priority, the card management unit enables the bank card application B to serve as the first NFC application performing the first transaction, and sends the first service instruction to the bank card application B (or the NFCEE in which the bank card application B is located). If the policy enforcement condition set by the user does not allow the first transaction to be performed by using the NFC application having the less priority, the first transaction finishes/fails, or the terminal prompts again the user to perform setting of the policy enforcement condition (that is, prompts the user to confirm again whether to allow the first transaction to be performed by using the NFC application having the less priority).

The foregoing manners in which the second response message to the second service instruction is used are mainly used for a scenario in which there are a plurality of NFC applications matching the type of the POS. When initiating the first transaction to the terminal, the POS first sends the second service instruction to the terminal. After receiving the second service instruction, the terminal sends the second response message that is to the second service instruction and that includes information of the NFC applications matching the type of the POS and priorities sorting information. The POS then may select, based on its own capability and the second response message, an NFC application used to perform the first transaction, and indicates, by using the first service instruction, to the terminal the NFC application selected by the POS. After receiving the first service instruction, the terminal finally determines, based on whether the NFC application indicated by the first service instruction is an NFC application having a top priority and based on the policy enforcement condition, the first NFC application used to perform the first transaction, and sends the first service instruction to the first NFC application (or the NFCEE in which the first NFC application is located).

The foregoing describes the embodiments of this application when the use condition of the first NFC application is already satisfied. In S505, the terminal may perform some operations if the use condition of the first NFC application is unsatisfied, to enable the use condition of the first NFC application to be satisfied: The terminal performs a preprocessing flow of the first NFC application if the use condition of the first NFC application is unsatisfied. The preprocessing flow is used to enable the use condition of the first NFC application to be satisfied. The first NFC application then receives the first service instruction, and performs the first transaction based on the first service instruction.

The preprocessing flow may be performed by the card management unit, or may be performed by a wallet application that corresponds to the first NFC application and that is notified by the card management unit.

Similarly, the first service instruction received by the first NFC application may be sent by the card management unit, or may be sent by the NFC controller instructed by the card management unit. That is, before the first NFC application receives the first service instruction, and performs the first transaction based on the first service instruction, the card management unit may send the first service instruction to the first NFC application; or the card management unit may instruct the NFC controller to send the first service instruction to the first NFC application. The first NFC application then receives the first service instruction, and responds to the first service instruction sent by the POS, to perform the first transaction.

Optionally, before the first NFC application receives the first service instruction, the card management unit may trigger the POS to resend the first service instruction. The NFC controller receives the first service instruction resent by the POS. The NFC controller sends, to the first NFC application, the first service instruction resent by the POS. Alternatively, the NFC controller sends, to the card management unit, the first service instruction resent by the POS. That the first NFC application receives the first service instruction, and performs the first transaction based on the first service instruction may be specifically implemented in the following manner. The first NFC application receives the first service instruction sent by the NFC controller, and responds to the first service instruction sent by the POS, to perform the first transaction. Alternatively, the first NFC application receives the first service instruction sent by the card management unit, and responds to the first service instruction sent by the POS, to perform the first transaction.

According to the foregoing solution, the card management unit may trigger the POS to resend the first service instruction before the first NFC application receives the first service instruction. The first NFC application then may receive, from the card management unit or the NFC controller, the first service instruction resent by the POS.

As described in the foregoing examples, the use condition of the first NFC application may indicate that the first NFC application may complete a transaction procedure only after user identity verification (such as the CDCVM) is performed on the terminal. When the use condition of the first NFC application is unsatisfied, the terminal performs the preprocessing flow of the first NFC application, and a specific implementation may be: If the card management unit determines that the use condition of the first NFC application indicates that the terminal needs to perform the CDCVM, and the terminal does not perform the CDCVM, the terminal triggers the POS to perform a Try Again procedure, and triggers the CDCVM to be performed. It should be noted that when the terminal performs the CDCVM (or when the POS performs the Try Again procedure), the POS may prompt a user to enable a card to touch or get close to the POS again or enable the card to touch or get close to the POS after the identity verification is performed. The user can perform operations based on the prompt of the terminal.

According to the foregoing implementation, not only the preprocessing flow of the first NFC application can be completed, so that the use condition of the first NFC application is satisfied, but also the foregoing transaction latency problem can be avoided by using a processing mechanism of the existing Try Again procedure, thereby improving user experience.

When the POS performs the Try Again procedure, the POS returns again to a state of waiting to read a card after transaction preprocessing, and the terminal performs the CDCVM. After the terminal completes the CDCVM, and after the first NFC application records a result that the CDCVM is already performed, the user enables the terminal to get close to the POS. After establishing the NFC radio frequency connection to the terminal, the POS resends the first service instruction, and performs NFC application selection. By comparing the first service instruction and the first comparison relationship, the card management unit in the terminal still selects the first NFC application to perform the first transaction. In this case, the terminal already performs the CDCVM. Therefore, the card management unit can directly send the first service instruction to the first NFC application, and the first NFC application then performs the first transaction.

After the POS performs the Try Again procedure, and after the terminal and the POS waiting to read a card establish the NFC radio frequency connection, the POS resends the first service instruction. Therefore, by using the foregoing solution, a problem of an overtime transaction existing in the prior art can be avoided, thereby improving user experience. In addition, the foregoing solution provides an opportunity for the terminal to perform the CDCVM by using the processing mechanism in the existing Try Again procedure in which the POS returns again to the state of waiting to read a card. Therefore, the POS does not need to be modified (that is, that the terminal performs the CDCVM may be implemented by using a POS that does not support the CDCVM), so that the foregoing solution can be applicable to an existing POS that does not support the CDCVM. In addition, a terminal user does not need to manually select a bank card, and only needs to perform the CDCVM on the terminal based on a prompt after enabling the terminal to get close to the POS at the first time. Therefore, for the terminal user, user operations become simple by using the foregoing solution.

In the prior art, if a response of a card application in an initial transaction processing process carries a status word "6986", after parsing out the status word, a POS that supports the CDCVM performs the Try Again procedure. In embodiments of this application, the operation of the POS performing the Try Again procedure may be triggered by the terminal, a specific manner may be: The card management unit sends the first service instruction to the first NFC application. The first NFC application sends, to the POS, the first response message to the first service instruction. The first NFC application receives a third service instruction sent by the POS, where the third service instruction is used to perform initial transaction processing. The card management unit obtains a third response message of the first NFC application to the third service instruction. The card management unit determines whether the third response message includes a designated status word, where the designated status word is used by the card management unit to determine whether the POS supports the CDCVM. If the third response message includes the designated status word, the card management unit instructs the NFC controller to send the third response message to the POS, to trigger the POS to perform the Try Again procedure; or if the third response message does not include the designated status word, the card management unit holds back the third response message or the card management unit instructs the NFC controller to hold back the third response message, to trigger the POS to perform the Try Again procedure (designed in the prior art for resolving a problem of a card accidentally falling or the like).

For example, the third service instruction may be a GPO instruction, or the third service instruction may be a GPO RESPONSE message. Certainly, a type of the third service instruction and a type of the third response message in this embodiment of this application are not limited to the types in this example, another instruction that may be used to perform the initial transaction processing may alternatively be considered as the third service instruction, and another message that may be used to perform an initial transaction processing response may alternatively be considered as the third response message.

The designated status word may be the status word "6986" in the prior art used to trigger the POS to perform the Try Again procedure. Different from the prior art, the designated status word in this embodiment of this application functions differently from the status word "6986" in the prior art.

In the prior art, the status word "6986" is used to indicate that an NFC application requires that the transaction procedure can be completed only after the CDCVM is performed, while the terminal has not performed the CDCVM.

In the embodiments of this application, before sending the first service instruction to the first NFC application, the card management unit already determines that the use condition of the first NFC application indicates that the terminal needs to perform the CDCVM and the terminal does not perform the CDCVM. The third service instruction sent by the POS to the terminal indicates performance information of the POS and a condition of a present transaction. Therefore, the first NFC application may determine, based on the third service instruction, whether the POS supports the verification manner, CDCVM. If the POS supports the CDCVM, the first NFC application carries the designated status word (such as the status word "6986") in the third response message. If the POS does not support the CDCVM, the first NFC application carries another status word (such as a status word "9000" indicating a successful response) in the third response message. In this embodiment of this application, after determining whether the third response message includes the designated status word, the card management unit may determine whether the POS supports the CDCVM, and triggers the POS to perform the Try Again procedure in different manners when the POS supports the CDCVM and when the POS does not support the CDCVM.

When determining that the POS supports the CDCVM (as the status word "6986"), the card management unit instructs the NFC controller to send the third response message to the POS, to trigger the POS to perform the Try Again procedure. The manner in which the POS is triggered to perform the Try Again procedure is similar to the prior art. After parsing out the designated status word carried in the third response message, the POS determines that the terminal does not perform the CDCVM, so that the POS is triggered to perform the Try Again procedure, returns to the state of waiting to read a card after the transaction preprocessing, and waits for the CDCVM to be completed on the terminal.

When determining that the POS does not support the CDCVM (as another status word, such as "9000"), the card management unit holds back the third response message, or the card management unit instructs the NFC controller to hold back the third response message, to trigger the POS to perform the Try Again procedure. In such a manner, because the POS does not support the CDCVM, although an identity verification requirement of a card (the first NFC application) forcibly requires that the transaction can be completed only after the identity verification is performed, the card does not select the CDCVM as a cardholder verification manner of the present transaction. Therefore, the particular designated status word "6986" in the CDCVM scenario does not appear. Instead, the card determines, in the response, that a CVM is presently performed in an online PIN or a signature manner. In this case, the card management unit holds back the third response message. When not receiving the third response message in a specific time length, the POS determines that the third service instruction is not responded, and then performs the Try Again procedure. It should be noted that after performing the Try Again procedure, the POS prompts again the terminal to perform the CDCVM. When the terminal performs the CDCVM, the CDCVM may be performed by the card management unit, or performed by a wallet application that manages the first NFC application and that is awakened by the card management unit, or performed by the NFC controller instructed by the card management unit.

It should be noted that when the terminal performs the CDCVM (or when the POS performs the Try Again procedure), the POS may prompt a user to enable a card to touch or get close to the POS again or enable the card to touch or get close to the POS after the identity verification is performed. The user can perform operations based on the prompt of the terminal. In addition, before triggering the POS to perform the Try Again procedure, the card management unit may mark the first transaction presently initiated by the POS. Advantages of the marking are: 1. After receiving the second response message sent by the first NFC application, the card management unit may determine, based on the mark, that the card management unit needs to trigger the POS that initiates the first transaction to perform the Try Again procedure. 2. If the first transaction fails because the CDCVM needs to be performed, when initiating the transaction again, the POS may detect existence of marked transaction/state last time. The terminal receives a SELECT PPSE instruction, determines that a scenario is a scenario of swiping a bank card, then directly selects a first NFC application corresponding to the mark to perform the present transaction, and routes, to the first NFC application, a service instruction sent by the POS while does not need to perform again an operation of selecting an NFC application corresponding to the POS.

In this embodiment of this application, the card management unit is responsible for managing a plurality of NFC applications installed in the terminal, and information of the plurality of NFC applications are stored in the card management unit, for example, use conditions respectively corresponding to the plurality of NFC applications, and the first comparison relationship used to indicate one-to-one correspondences between the plurality of NFC applications and a plurality of service instructions. After receiving the service instruction sent by the POS, the NFC controller may route the service instruction to the card management unit, and the card management unit performs NFC application selection and control of the present transaction. Before the terminal selects the first NFC application corresponding to the POS, and performs the first transaction when the use condition of the first NFC application is already satisfied, the card management unit may send a first message to the NFC controller, where the first message is used to instruct the NFC controller to send the received service instruction to the card management unit. In this way, all service instructions received by the NFC controller and sent by the POS are all directly routed to the card management unit, so that the card management unit performing the NFC application selection and control is facilitated.

After receiving the first message, the NFC controller may set routing information in a routing table, to route, to the card management unit, the service instruction sent by the POS.

In addition, routing information in the NFC controller may further have a different setting in a special case. For example, before the terminal is power-off the routing information is all set to point to a bus card application, and the bus card application is set to be in an activated state. Therefore, by using such a setting, a transaction of swiping a bus card may still be implemented after the terminal is power-off. For another example, after receiving the first service instruction and selecting the first NFC application, the card management unit may set the routing information to point to the NFCEE storing the first NFC application, and after the first transaction is completed, may set the routing information to point to the card management unit, so that when the terminal performs a transaction again, the POS still sends the first service instruction to the card management unit for performing the NFC application selection.

The foregoing descriptions of the embodiments of this application are mainly for a rapid card swiping transaction. As described above, there are two transaction manners between the POS and the terminal: an active card selection transaction, and a rapid card swiping transaction. For the active card selection transaction manner, if being in a case in which before the terminal touches the POS in S401, the terminal receives an instruction in which a user selects a second NFC application, a specific implementation of that in S402, the terminal selects the first NFC application corresponding to the POS, and performs the first transaction when the use condition of the first NFC application is already satisfied may be: If the second NFC application does not match the type of the POS, the terminal selects the first NFC application corresponding to the POS, and performs the first transaction when the use condition of the first NFC application is already satisfied.

The second NFC application is an NFC application manually selected by the user for the to-be-initiated first transaction before the terminal touches the POS. That is, before the terminal initiates the first transaction, the user manually selects the second NFC application to perform the to-be-initiated first transaction. When determining that the second NFC application does not match the type of the POS, the terminal can automatically select a first NFC application that matches the type of the POS to perform the first transaction, so that when the second NFC manually selected by the user does not match the type of the POS, a problem that relatively poor user experience is caused by operations, such as that the user manually switches NFC applications, and that a POS end re-initiates a transaction, is avoided.

For example, before the terminal initiates the first transaction, such as a transaction of swiping a bus card, the user manually selects a bank card application to perform the first transaction. After initiating the first transaction, the terminal determines that the bank card application does not match a type of a bus POS machine. In this case, the terminal may select a bus card application that matches the type of the bus POS machine to perform the first transaction.

In addition, for the active card selection transaction manner, if being in a case in which before the terminal establishes the NFC radio frequency connection to the POS in S401, the terminal receives an instruction in which a user selects a third NFC application, the terminal may select the third NFC application, and perform the first transaction when a use condition of the third NFC application is already satisfied after the terminal establishes the NFC radio frequency connection to the point of sale POS, and when the third NFC application selected by the user matches the type of the POS.

In such a manner, use conditions of the user in different scenarios can be satisfied, and the first transaction presently initiated by the POS is performed by using, in priority, the third NFC application manually selected by the user.

It should also be noted that when the third NFC application selected by the user matches the type of the POS, the card management unit in the terminal still needs to determine the use condition of the third NFC application. If the use condition of the third NFC application is satisfied, the third NFC application receives the first service instruction and performs the first transaction. If the use condition of the third NFC application is unsatisfied, the first service instruction is sent to the third NFC application only after the use condition of the third NFC application is satisfied by using the preprocessing flow that still needs to be performed. The performing steps and implementations are the same as the foregoing described performing steps and implementations when the first NFC application performs the first transaction, and details are not described herein again.

With reference to foregoing descriptions of the embodiments of this application, the card management unit in the embodiments of this application may be considered as a module in an operating system of the terminal. The first comparison relationship, and the use conditions respectively corresponding to the plurality of NFC applications in the terminal may be stored in the card management unit. The card management unit may implement the following operations: selecting an NFC application corresponding to the POS for a transaction initiated by the POS, and implementing activation of cross-storage locations (SE/TEE/REE) of the NFC application and routing of a service instruction; checking and preprocessing use conditions of various NFC applications; performing personal configuration of user use policies and policy enforcement conditions of various NFC applications to resolve selection collision between NFC applications having a same type; and performing collision processing when an NFC application manually selected by a user does not match the type of the POS, and automatically selecting an NFC application having a matched type for the transaction. It can be understood that because the card management unit plays an important role in an NFC application selection process, security of a transaction is higher when the card management unit is implemented in the TEE.

According to the terminal transaction method provided in the embodiments of this application, an NFC application that performs the first transaction initiated by the POS is a first NFC application that is supported by the terminal, that corresponds to the POS, and of which the use condition is satisfied. Therefore, by using the first NFC application to perform the first transaction, performing the first transaction can be completed, avoiding a problem that in the prior art, relatively poor user experience is caused when a selected NFC application does not match the type of the POS. In addition, according to the terminal transaction method provided in the embodiments of this application, a case in which the POS begins to re-initiate a transaction from transaction preprocessing because the use condition of the NFC application is unsatisfied may be further avoided, thereby improving user experience.

The embodiments of this application leads a module of the card management unit into the terminal, and can be used to manage all NFC applications (stored in different NFCEE and managed by different wallet applications) installed in the terminal, so that a series of solutions are provided when there is a collision when the terminal performs NFC application selection (that is, there are a plurality of NFC applications that match the type of the POS). Compared to the prior art, user experience of the terminal is improved.

First, in terms of the terminal, there are a plurality of wallet applications in the terminal. In a solution in the prior art, only a default wallet application can be selected. When the POS initiates a transaction of opening door under door control, if a door control card application is managed by a wallet A, and a default NFC application is managed by a wallet B, a user needs to manually switch wallet applications. In the embodiments of this application, the first comparison relationship and the use conditions of the plurality of NFC applications are stored in the card management unit. The plurality of NFC applications may be managed by different wallet applications, or may be stored in different NFCEE. Therefore, the card management unit does not limit the wallet application that manages the first NFC application, so that there is not a problem of manually switching wallet applications in the prior art.

Second, in terms of the wallet applications, different NFC applications have different use conditions. If a transaction is performed by using a default NFC application, to simultaneously ensure that a use condition of the default NFC application is already satisfied and that a type of the default NFC application matches the type of the POS is difficult. In the embodiments of this application, the first NFC application selected by the card management unit is an NFC application that matches the type of the POS. The use condition of the first NFC application is stored in the card management unit, so that the card management unit can perform determining based on the use condition of the first NFC application, and further determine that the use condition of the first NFC application is already satisfied, or the terminal performs the preprocessing flow to enable the use condition of the first NFC application to be satisfied, and ensures that the first transaction can be performed.

Third, when a quantity of NFC applications that match the type of the POS are a plurality of (such as in a scenario of swiping a bank card), a solution in the prior art selects a default NFC application to perform a transaction, while in the embodiments of this application, an NFC application used to perform the transaction may be flexibly selected based on user use policies of a plurality of NFC applications that match the type of the POS. For example, a bank card application having a greatest discount amount is selected, or a bank card application relatively far from a due date is selected.

Figure 6:
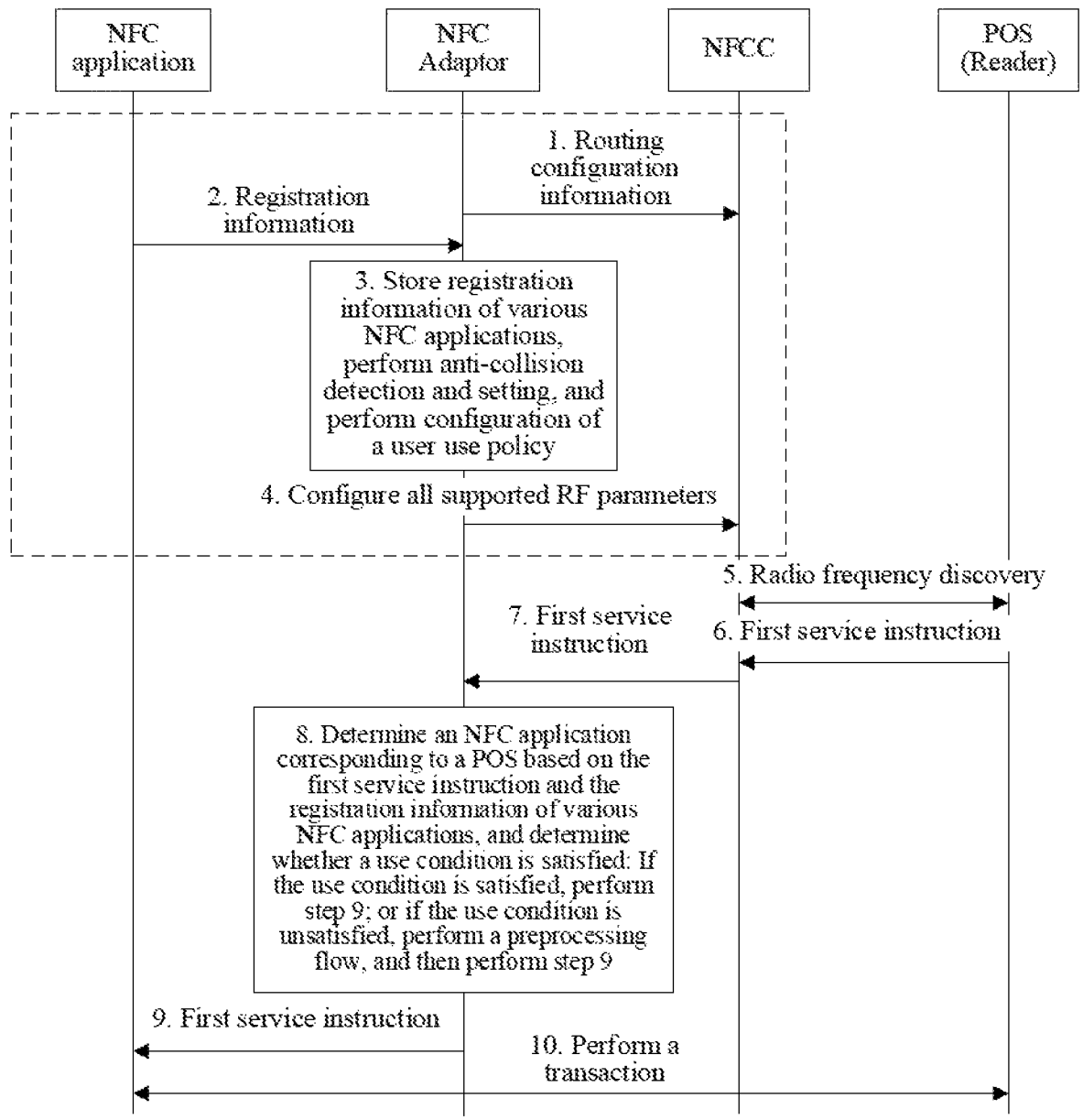
FIG. 6 is a schematic flowchart of a third terminal transaction method according to an embodiment of this application.

Based on the foregoing embodiments, in an embodiment of this application, a terminal transaction method is further provided. The method can be considered as a specific example of the method shown in FIG. 4 or FIG. 5. With reference to FIG. 6, the method includes the following steps:

1. An NFC adaptor sends routing information to the NFCC.

The NFC adaptor can be considered as a specific example of the card management unit. The routing information can be considered as a specific example of the first message. After receiving the first message, the NFCC can know: If receiving a service instruction sent by the POS, the NFCC sends the service instruction to the NFC adaptor.

2. An NFC application sends registration information to the NFC adaptor.

The registration information may include a use condition of the NFC application and the first comparison relationship used to indicate one-to-one correspondences between a plurality of NFC applications and a plurality of service instructions. The registration information may further include the second comparison relationship used to indicate correspondences between the second service instruction and the plurality of NFC applications.

3. The NFC adaptor stores registration information of various NFC applications, performs anti-collision detection and setting, and performs configuration of a user use policy.

The anti-collision detection and setting is to detect information about whether use conditions of various NFC applications collide, usage priorities of various NFC applications, and the like.

4. The NFC adaptor configures all supported RF parameters to the NFCC.

By performing step 4, the NFCC may obtain all communication types supported by the terminal by using the all supported RF parameters, and further performs corresponding processing after the NFCC establishes radio frequency communication with the POS. For a transaction type supported by the terminal, the NFCC routes the service instruction to the NFC adaptor. For a transaction type not supported by the terminal, the NFCC responds an error message.

For example, after receiving registration information of all NFC applications installed in the terminal, the NFC adaptor knows: A bank card application and a door control card application are installed in the terminal while a bus card application is not installed. The NFC adaptor then sends RF parameters of the bank card application and RF parameters of the door control card application to the NFCC. When a user holds a terminal in hand to touch a bus POS machine, if the terminal does not support an RF technology of a bus POS, the terminal does not establish an NFC radio frequency connection to the bus POS machine.

5. The POS and the NFCC establish the NFC radio frequency connection by using a radio frequency discovery process.

6. The POS sends the first service instruction to the NFCC.

7. After receiving the first service instruction, the NFCC sends, based on indication of the routing information, the first service instruction to the NFC adaptor.

8. The NFC adaptor determines, based on the first service instruction and the registration information of various NFC applications, an NFC application corresponding to the POS, and determines whether a use condition of the NFC application is satisfied: If the use condition is satisfied, perform step 9. If the use condition is unsatisfied, perform the preprocessing flow, and then perform step 9.

9. The NFC adaptor sends the first service instruction to the NFC application determined in step 8.

Optionally, in step 9, the NFC adaptor may alternatively instruct the NFCC to send the first service instruction to the NFC application determined in step 8.

10. After receiving the first service instruction, the first NFC application performs the NFC radio frequency connection to the POS, and further performs a present transaction.

In the method shown in FIG. 6, step 1 to step 4 in a dashed-line box are preceding steps performed before the user enables a card to touch or get close to the POS, mainly used for the terminal to perform operations of parameter setting and the like. Step 5 to step 10 are steps performed after the user enables the card to touch or get close to the POS. By performing step 6 to step 10, the NFC application corresponding to the POS may be selected to perform the present transaction. A specific operation of performing the transaction by using the NFC application and the POS performing the radio frequency connection in step 10 is the same as the prior art, and details are not described herein again.

It should be noted that the terminal transaction method shown in FIG. 6 may be considered as a specific example of the method shown in FIG. 4 or FIG. 5. For an implementation not described in detail of the terminal transaction method shown in FIG. 6, refer to related descriptions of the method shown in FIG. 4 or FIG. 5.

In step 8 of the method shown in FIG. 6, if the use condition is unsatisfied, the card management unit needs to perform the preprocessing flow, and then performs step 9. In this case, a specific implementation process of step 7 and that of step 8 may be shown in FIG. 7:

1. The NFC adaptor receives the first service instruction sent by the POS.

Figure 7:
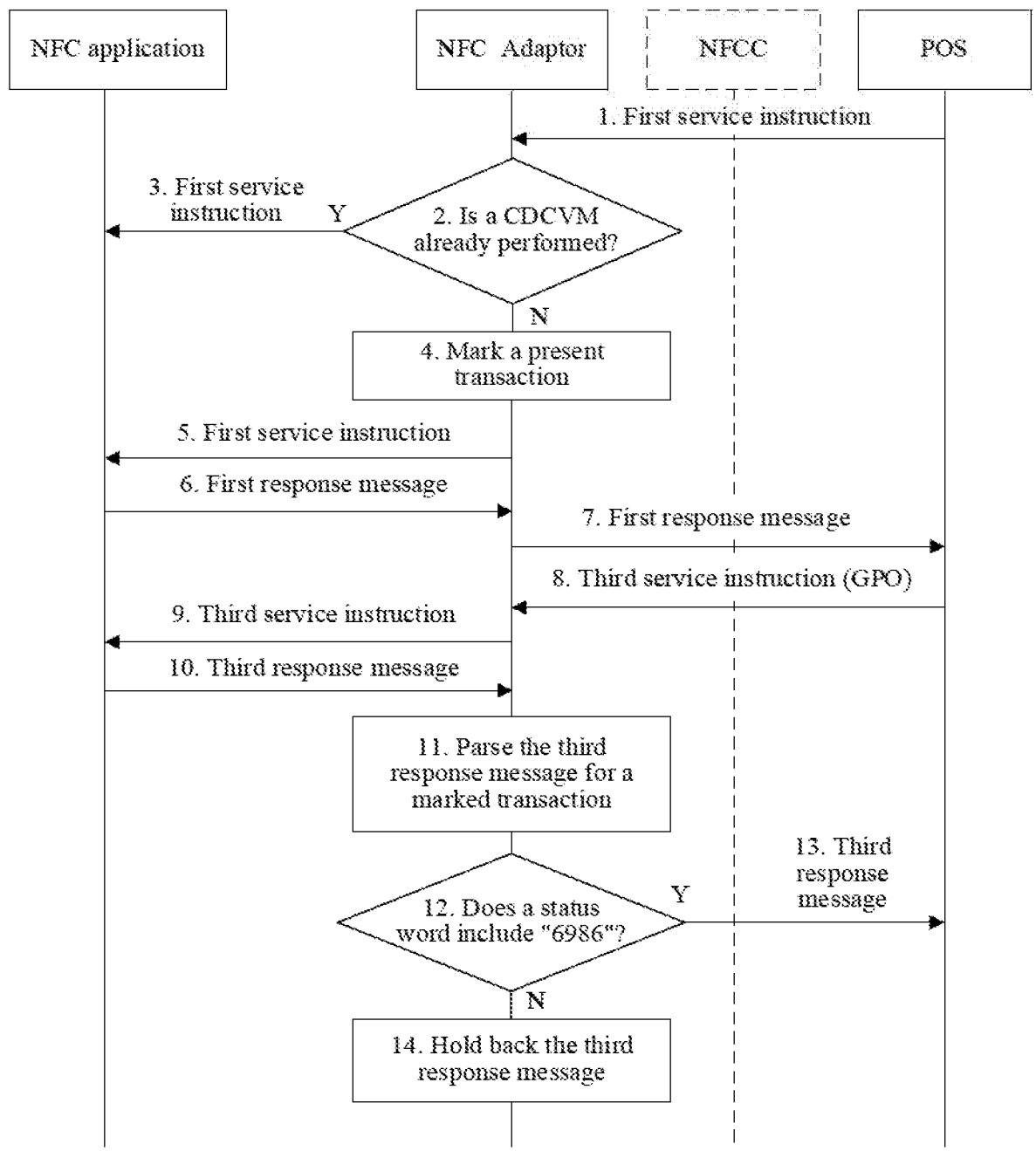
FIG. 7 is a schematic flowchart of a preprocessing procedure according to an embodiment of this application.

Step 1 in FIG. 7 of the NFC adaptor receiving the first service instruction sent by the POS may be considered as step 6 and step 7 in FIG. 6.

2. Determine whether the terminal has already performed the CDCVM after determining that the NFC application corresponding to the POS requires to the CDCVM to be performed. Perform step 3 and perform a service interaction process in the prior art if the CDCVM is already performed. Perform step 4 and subsequent operations if the CDCVM is not performed 3. The NFC adaptor sends the first service instruction to an NFC application.

4. The NFC adaptor marks a present transaction, so that the NFC adaptor parses a response message of the present transaction subsequently.

5. The NFC adaptor sends the first service instruction to the NFC application.

6. The NFC application sends, to the NFC adaptor, the first response message to the first service instruction.

7. The NFC adaptor sends the first response message to the POS.

8. The NFC adaptor receives a third service instruction sent by the POS.

The third service instruction may be considered as the foregoing GPO message.

9. The NFC adaptor sends the third service instruction to the NFC application.

10. The NFC application sends, to the NFC adaptor, the third response message to the third service instruction.

11. After receiving the third response message, the NFC adaptor parses the third response message of the marked transaction.

12. The NFC adaptor determines whether the third response message carries the status word "6986". If the third response message carries the status word "6986", perform step 13. If the third response message does not carry the status word "6986", perform step 14.

13. The NFC adaptor sends the third response message to the POS.

14. The NFC adaptor holds back the third response message.

In the method shown in FIG. 7, interactions between the NFC adaptor and the POS are all performed by using the NFCC. To simplify the flowchart, FIG. 7 simply indicates, by using the NFCC indicated through a dashed line between the NFC adaptor and the POS, a process in which the NFC adaptor and the POS communicate by using the NFCC.

It should be noted that the method shown in FIG. 7 may be considered as a specific example of step 7 and step 8 in the method shown in FIG. 6. For an implementation not described in detail of the method shown in FIG. 7, refer to related descriptions of the method shown in FIG. 6, or refer to related descriptions of the method shown in FIG. 4 or FIG. 5.

The terminal transaction method provided in the embodiments of this application is not only applicable to the scenario of the rapid card swiping transaction shown in FIG. 6 or FIG. 7, but also applicable to the scenario of the active card selection transaction. In the scenario of the active card selection transaction, a specific example of the terminal transaction method provided in the embodiments of this application may be shown in FIG. 8.

1. An NFC adaptor receives a first service instruction sent by a POS.

Figure 8:
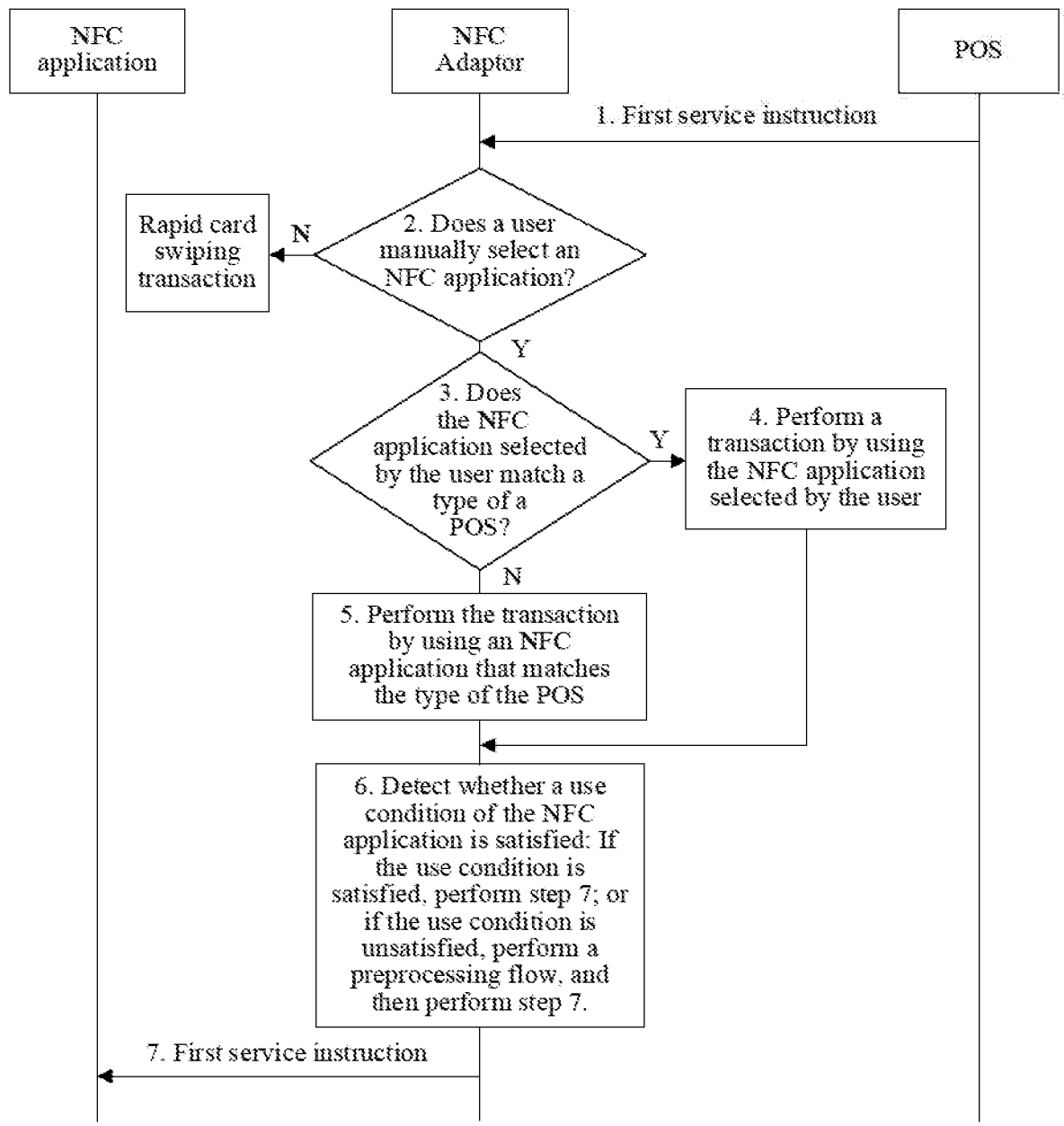
FIG. 8 is a schematic flowchart of a fourth terminal transaction method according to an embodiment of this application.

Step 1 in FIG. 8 of the NFC adaptor receiving the first service instruction sent by the POS may be considered as step 6 and step 7 in FIG. 6.

2. Determine whether a user manually selects one NFC application. If the user manually selects one NFC application, perform step 3. If the user does not manually select one NFC application, the scenario belongs to the scenario of the rapid card swiping transaction shown in FIG. 6.

3. Determine whether a type of the NFC application selected by the user matches a type of the POS. If the type of the NFC application selected by the user matches the type of the POS, perform step 4. If the type of the NFC application selected by the user does not match the type of the POS, perform step 5.

4. Determine to perform a present transaction by using the NFC application selected by the user, and then perform step 6.

5. Determine to perform the transaction by using the NFC application that matches the type of the POS and that is determined based on the first service instruction.

6. Detect whether a use condition of the NFC application is satisfied. If the use condition is satisfied, perform step 7. If the use condition is unsatisfied, perform a preprocessing flow, and then perform step 7.

For a specific step of the preprocessing flow, refer to the method shown in FIG. 7, and details are not described herein again.

7. The NFC adaptor sends the first service instruction to the NFC application that performs the present transaction.

In the method shown in FIG. 8, interactions between the NFC adaptor and the POS are all performed by using the NFCC. To simplify the flowchart, FIG. 8 does not show a process in which the NFC adaptor and the POS interact by using the NFCC.

It should be noted that in the related descriptions of the terminal transaction method shown in FIG. 4 or FIG. 5, a specific implementation solution in the scenario of the active card selection transaction has already been introduced. The method shown in FIG. 8 may be considered as a specific example of the method shown in FIG. 4 or FIG. 5. For an implementation not described in detail of the method shown in FIG. 8, refer to related descriptions of the method shown in FIG. 4 or FIG. 5.

According to the terminal transaction method provided in the embodiments of this application, an NFC application that performs the first transaction initiated by the POS is a first NFC application that is selected by the terminal, that corresponds to the POS, and of which the use condition is satisfied. Therefore, by using the first NFC application to perform the first transaction, performing the first transaction can be completed, avoiding a problem that in the prior art, relatively poor user experience is caused when a selected NFC application does not match the type of the POS. In addition, according to the terminal transaction method provided in the embodiments of this application, the preprocessing flow may be further performed by the POS triggered when an identity verification requirement of the NFC application is unsatisfied. When the POS is not modified, the identity verification requirement of the NFC application is satisfied, thereby improving user experience.

Figure 9:
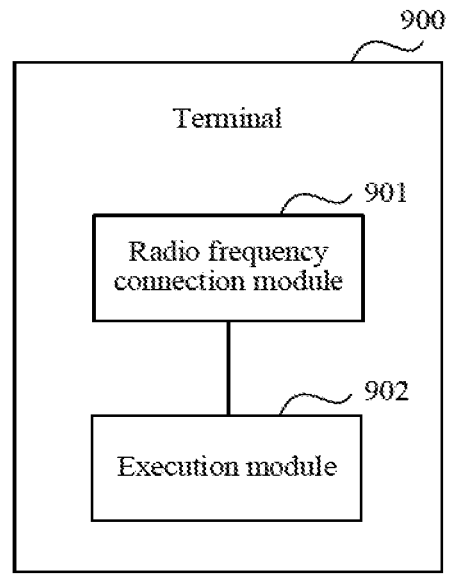
FIG. 9 is a schematic structural diagram of a terminal according to an embodiment of this application.

Based on a same invention concept, an embodiment of this application provides a terminal. The terminal can implement the method provided in the embodiment corresponding to FIG. 4. With reference to FIG. 9, the terminal 900 includes: a radio frequency connection module 901, and an execution module 902, where the radio frequency connection module 901, configured to: establish an NFC radio frequency connection to a POS, and start up a first transaction; and the execution module 902, configured to: select a first NFC application corresponding to the POS, and perform the first transaction when a use condition of the first NFC application is already satisfied.

The first NFC application may be an NFC application installed in an SE, or the first NFC application may be an NFC application installed in a TEE, or the first NFC application may be an NFC application installed in an REE.

In a case of an active card selection transaction, in a possible implementation, the terminal 900 further includes a first transceiver module, where the first transceiver module is configured to: before the radio frequency connection module 901 starts up the first transaction, receive an instruction in which a user selects a second NFC application. When selecting a first NFC application corresponding to the POS, and performing the first transaction when a use condition of the first NFC application is already satisfied, the execution module 902 is specifically configured to: if the second NFC application does not match a type of the POS, select the first NFC application corresponding to the POS, and perform the first transaction when the use condition of the first NFC application is already satisfied.

In a possible implementation, the execution module 902 includes an NFC controller, a card management unit, and a first NFC application. The selecting, by the execution module 902, the first NFC application corresponding to the POS, and performing the first transaction when the use condition of the first NFC application is already satisfied specifically includes: receiving, by the NFC controller, the first service instruction sent by the POS; sending, by the NFC controller, the first service instruction to the card management unit in the terminal, where a first comparison relationship and use conditions respectively corresponding to a plurality of NFC applications in the terminal are stored in the card management unit, the first comparison relationship is used to indicate one-to-one correspondences between the plurality of NFC applications and a plurality of service instructions, and the first NFC application is one of the plurality of NFC applications; selecting, by the card management unit based on the first service instruction and the first comparison relationship, the first NFC application that corresponds to the POS and that is in the plurality of NFC applications; and if a use condition of the first NFC application is already satisfied, receiving, by the first NFC application, the first service instruction, and performing the first transaction based on the first service instruction.

The use conditions respectively corresponding to the plurality of NFC applications include one or more of the following information: identity verification requirements respectively corresponding to the plurality of NFC applications; access control policies respectively corresponding to the plurality of NFC applications; and user use policies and policy enforcement conditions both respectively corresponding to the plurality of NFC applications.

In a possible implementation, the NFC controller is configured to: before receiving the first service instruction sent by the POS, receive a second service instruction sent by the POS; and send the second service instruction to the card management unit.

The card management unit is further configured to:

determine, based on the second service instruction and a second comparison relationship, at least one NFC application that matches a type of the second service instruction and that is in the plurality of NFC applications, where the second comparison relationship is used to indicate a matching relationship between the second service instruction and the plurality of NFC applications: and send, to the POS, a second response message to the second service instruction, where the second response message is used to indicate at least one NFC application that matches the type of the POS and that is in the plurality of NFC applications, so that the POS generates the first service instruction based on the second response message; or send the second service instruction to an NFCEE in which a designated NFC application in the at least one NFC application is located, receive a second response message to the second service instruction, and send the second response message to the POS, so that the POS generates the first service instruction based on the second response message, where the second response message is used to indicate M NFC applications that match the type of the POS and that are stored in the NFCEE, M is greater than or equal to 1, and the M NFC applications include the designated NFC application.

In a possible implementation, the card management unit is further configured to: before the receiving, by the first NFC application, the first service instruction, and performing the first transaction based on the first service instruction, send the first service instruction to the first NFC application or instruct the NFC controller to send the first service instruction to the first NFC application.

To implement performing the first transaction when the use condition of the first NFC application is unsatisfied. In a possible implementation, the execution module 902 is further configured to: when the use condition of the first NFC application is unsatisfied, perform a preprocessing flow of the first NFC application, where the preprocessing flow is used to enable the use condition of the first NFC application to be satisfied. The first NFC application is further used to: receive the first service instruction, and perform the first transaction based on the first service instruction.

In a possible implementation, the card management unit is further configured to: before the receiving, by the first NFC application, the first service instruction, and performing the first transaction based on the first service instruction, send the first service instruction to the first NFC application or instruct the NFC controller to send the first service instruction to the first NFC application.

In a possible implementation, the card management unit is further configured to: before the receiving, by the first NFC application, the first service instruction, trigger the POS to resend the first service instruction;

the NFC controller is further configured to: receive the first service instruction resent by the POS; and send, to the first NFC application, the first service instruction resent by the POS; or send, to the card management unit, the first service instruction resent by the POS; and when receiving the first service instruction, and performing the first transaction based on the first service instruction, the first NFC application is specifically configured to: receive the first service instruction sent by the NFC controller, and respond to the first service instruction sent by the POS, to perform the first transaction; or receive the first service instruction sent by the card management unit, and respond to the first service instruction sent by the POS, to perform the first transaction.

In a possible implementation, when performing the preprocessing flow of the first NFC application, the processing module 902 is specifically configured to: if the card management unit determines that the use condition of the first NFC application indicates that the terminal needs to perform a CDCVM, and the terminal does not perform the CDCVM, trigger the POS to perform a Try Again procedure, and trigger the terminal to perform the CDCVM.

In a possible implementation, the triggering, by the execution module 902, the POS to perform the Try Again procedure specifically includes: sending, by the card management unit, the first service instruction to the first NFC application; sending, by the first NFC application to the POS, the first response message to the first service instruction; receiving, by the first NFC application, a third service instruction sent by the POS, where the third service instruction is used to perform initial transaction processing; obtaining, by the card management unit, a third response message of the first NFC application to the third service instruction; determining, by the card management unit, whether the third response message includes a designated status word, where the designated status word is used by the card management unit to determine whether the POS supports the CDCVM, and if the third response message includes the designated status word, instructing, by the card management unit, the NFC controller to send the third response message to the POS, to trigger the POS to perform the Try Again procedure; or if the third response message does not include the designated status word, holding back, by the card management unit, the third response message or instructing, by the card management unit, the NFC controller to hold back the third response message, to trigger the POS to perform the Try Again procedure.

In a possible implementation, the NFC controller is further configured to: before the selecting, by the execution module 902, a first NFC application corresponding to the POS, and performing the first transaction when a use condition of the first NFC application is already satisfied, receive a first message sent by the card management unit, where the first message is used to instruct the NFC controller to send a received service instruction to the card management unit.

The terminal 900 provided in the embodiments of this application may alternatively implement the active card selection transaction. In a possible implementation, the terminal 900 further includes: a second transceiver module, configured to: before the establishing, by the radio frequency connection module 901, a near field communication NFC radio frequency connection to a POS, receive the instruction in which the user selects the third NFC application; and the execution module 902, further configured to: after the establishing, by the radio frequency connection module 901, an NFC radio frequency connection to a POS, if the third NFC application matches the type of the POS, select the third NFC application, and perform the first transaction when a use condition of the third NFC application is already satisfied.

The second transceiver module may be a module same as the first transceiver module, or may be a module different from the first transceiver module.

It should be noted that, in this embodiment of this application, module division is used as an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

It should also be noted that the terminal 900 can implement the method provided in the embodiment corresponding to FIG. 4. For an implementation not described in detail of the terminal 900, refer to related descriptions of the method provided in the embodiment corresponding to FIG. 4.

Figure 10:
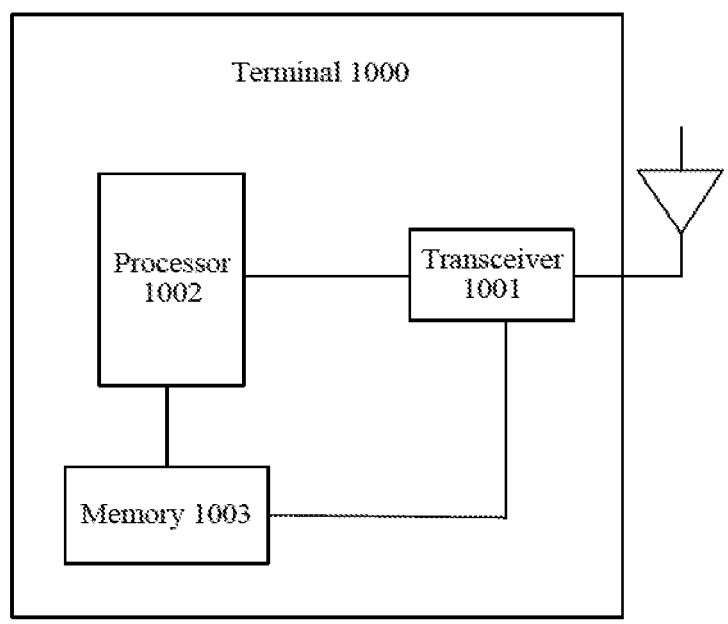
FIG. 10 is a schematic structural diagram of another terminal according to an embodiment of this application.

Based on a same invention concept, in an embodiment of this application, a terminal is further provided. The terminal uses the method provided in the embodiment corresponding to FIG. 4, and may be a device same as the terminal 900 shown in FIG. 9. With reference to FIG. 10, a terminal 1000 includes: a transceiver 1001, a processor 1002, and a memory 1003. The transceiver 1001, the processor 1002, and the memory 1003 are connected through a bus, to implement data exchange.

The transceiver 1001 is configured to support information sending and receiving between the terminal 1000 and the POS in the foregoing embodiments. The memory 1003 is configured to store program code and data that are of the terminal 1000. The processor 1002 is configured to: invoke the program code and data that are stored in the memory 1003, and perform the processing process in the method shown in FIG. 4 and/or another process used for a technology described in this application.

It should be noted that the radio frequency connection module 901 in the terminal 900 shown in FIG. 9 may be considered as an integrated module in the transceiver 1001, or may correspond to an independent induction chip. The execution module 902 in the terminal 900 shown in FIG. 9 may be considered as an integrated module in the processor 1002, or may correspond to an independent processing chip. Specifically, a card management unit and a first NFC application in the terminal 900 shown in FIG. 9 may be considered as an integrated module in the processor 1002, or may correspond to an independent processing chip. An NFC controller in the terminal 900 shown in FIG. 9 may be considered as an integrated module in the transceiver 1001, or may correspond to an independent induction chip. Optionally, the NFC controller may alternatively be considered as an integrated module in the processor 1002. A first transceiver module and a second transceiver module in the terminal 900 shown in FIG. 9 may be considered as an integrated module in the transceiver 1001.

In addition, the terminal 1000 may further include another interface, such as a fiber link interface, an Ethernet interface, a microwave link interface, a copper cable interface, to implement interactions between the terminal 1000 and another device (such as the POS).

Optionally, the processor 1002 may be a central processing unit, an ASIC, a field programmable gate array (FPGA) or a complex programmable logical device (CPLD).

It should be noted that the terminal 1000 shown in FIG. 10 merely includes one transceiver 1001, one processor 1002, and one processor 1003. In actual implementation, a quantity of the transceiver 1001, the processor 1002, and the memory 1003 may be one, or may be a plurality of.

It should also be noted that the terminal 1000 shown in FIG. 10 may implement the method provided in the embodiment corresponding to FIG. 4, or may be a device same as the terminal 900 shown in FIG. 9. Therefore, for an implementation not described in detail of the terminal 1000, refer to related descriptions of the method provided in the embodiment corresponding to FIG. 4 or related descriptions of the terminal 900 shown in FIG. 9.

In an embodiment of this application, a computer storage medium is further provided. The storage medium stores a software program. When read and executed by one or more processors, the software program may implement the terminal transaction method in the foregoing embodiment.

In conclusion, in the embodiments of this application, a terminal transaction method and a terminal are provided. According to the foregoing solutions provided in the embodiments of this application are used, an NFC application that performs the first transaction initiated by the POS is the first NFC application that is selected by the terminal, that corresponds to the POS, and of which the use condition is satisfied. Therefore, by using the first NFC application to perform the first transaction, performing the first transaction can be completed, avoiding a problem that in the prior art, relatively poor user experience is caused when a selected NFC application does not match the type of the POS.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A terminal transaction method, comprising:
    establishing, by a terminal, a near field communication (NFC) radio frequency connection to a point of sale (POS), and starting up a first transaction;
    sending, by a NFC controller, a first service instruction to a card management unit in the terminal, the first service instruction being an initial communication from the POS to the terminal, wherein a first comparison relationship and use conditions respectively corresponding to a plurality of NFC applications in the terminal are stored in the card management unit, the first comparison relationship is used to indicate one-to-one correspondences between the plurality of NFC applications and a plurality of service instructions, and a first NFC application is one of the plurality of NFC applications;
    selecting, by the card management unit in response to the first service instruction and based on the first comparison relationship, the first NFC application having the one-to-one correspondence with one of the plurality of service instructions that matches the first service instruction from the POS and that is in the plurality of NFC applications; and
    in response to the first NFC application being selected by the card management unit in the selecting, and with a use condition of the first NFC application being satisfied:
        sending, by the card management unit, the first service instruction to the first NFC application, or instructing, by the card management unit, the NFC controller to send the first service instruction to the first NFC application; and
        performing, by the first NFC application, the first transaction based on the first service instruction received by the first NFC application.

2. The method according to claim 1, wherein before the establishing of the NFC radio frequency connection, the method further comprises:
    receiving, by the terminal, an instruction in which a user selects a second NFC application, and
    with the second NFC application not matching a type of the POS, the selecting selects the first NFC application corresponding to the POS, and the performing performs the first transaction, with the use condition of the first NFC application being satisfied.

3. The method according to claim 1, further comprising performing, by the terminal, a preprocessing flow of the first NFC application with the use condition of the first NFC application being unsatisfied, wherein the preprocessing flow is used to enable the use condition of the first NFC application to be satisfied.

4. The method according to claim 1, wherein before the selecting of the first NFC application corresponding to the POS and the performing of the first transaction, the method further comprises receiving, by the NFC controller, a first message sent by the card management unit, wherein the first message is used to instruct the NFC controller to send a received service instruction to the card management unit.

5. The method according to claim 1,
    wherein before the establishing of the NFC radio frequency connection, the method further comprises receiving, by the terminal, an instruction in which a user selects a third NFC application, and
    wherein after the establishing of the NFC radio frequency connection, the method further comprises selecting, by the terminal, the third NFC application, and performing the first transaction with the third NFC application matching a type of the POS and a use condition of the third NFC application being satisfied.

6. The method according to claim 1, wherein the use conditions respectively corresponding to the plurality of NFC applications comprise one or more of the following information:
    identity verification requirements respectively corresponding to the plurality of NFC applications;
    access control policies respectively corresponding to the plurality of NFC applications; and
    user use policies and policy enforcement conditions both respectively corresponding to the plurality of NFC applications.

7. A terminal, comprising:
    a memory, configured to store a computer program; and
    a processor, configured to execute the computer program stored in the memory, to perform:
        establishing, by the terminal, a near field communication (NFC) radio frequency connection to a point of sale (POS), and starting up a first transaction;
        sending, by a NFC controller, a first service instruction to a card management unit in the terminal, the first service instruction being an initial communication from the POS to the terminal, wherein a first comparison relationship and use conditions respectively corresponding to a plurality of NFC applications in the terminal are stored in the card management unit, the first comparison relationship is used to indicate one-to-one correspondences between the plurality of NFC applications and a plurality of service instructions, and a first NFC application is one of the plurality of NFC applications;
        selecting, by the card management unit in response to the first service instruction and based on the first comparison relationship, the first NFC application having the one-to-one correspondence with one of the plurality of service instructions that matches the first service instruction from the POS and that is in the plurality of NFC applications; and
        in response to the first NFC application being selected by the card management unit in the selecting, and with a use condition of the first NFC application being satisfied:

sending, by the card management unit, the first service instruction to the first NFC application, or instructing, by the card management unit, the NFC controller to send the first service instruction to the first NFC application; and performing, by the first NFC application, the first transaction based on the first service instruction received by the first NFC application.

8. The terminal according to the claim 7, wherein the processor further performs a preprocessing flow of the first NFC application with the use condition of the first NFC application being unsatisfied, wherein the preprocessing flow is used to enable the use condition of the first NFC application to be satisfied.

9. The terminal according to the claim 7, wherein before the selecting of the first NFC application corresponding to the POS and the performing of the first transaction, the processor further performs receiving, by the NFC controller, a first message sent by the card management unit, wherein the first message is used to instruct the NFC controller to send a received service instruction to the card management unit.

10. The terminal according to the claim 7,
wherein before the establishing of the NFC radio frequency connection, the processor further performs receiving an instruction in which a user selects a third NFC application, and
wherein after the establishing of the NFC radio frequency connection, the processor further performs selecting the third NFC application, and performing the first transaction with the third NFC application matching a type of the POS and a use condition of the third NFC application being satisfied.

11. The terminal according to the claim 7, wherein the use conditions respectively corresponding to the plurality of NFC applications comprise one or more
identity verification requirements respectively corresponding to the plurality of NFC applications;
access control policies respectively corresponding to the plurality of NFC applications; and user use policies and policy enforcement conditions both respectively corresponding to the plurality of NFC applications.

12. A non-transitory computer-readable storage medium, comprising a program or an instruction, wherein when run on a terminal, the program or instruction enables the terminal to perform the following operations:
establishing, by the terminal, a near field communication (NFC) radio frequency connection to a point of sale (POS), and starting up a first transaction; and
sending, by a NFC controller, a first service instruction to a card management unit in the terminal, the first service instruction being an initial communication from the POS to the terminal, wherein a first comparison relationship and use conditions respectively corresponding to a plurality of NFC applications in the terminal are stored in the card management unit, the first comparison relationship is used to indicate one-to-one correspondences between the plurality of NFC applications and a plurality of service instructions, and a first NFC application is one of the plurality of NFC applications;
selecting, by the card management unit in response to the first service instruction and based on the first comparison relationship, the first NFC application having the one-to-one correspondence with one of the plurality of service instructions that matches the first service instruction from the POS and that is in the plurality of NFC applications; and
in response to the first NFC application being selected by the card management unit in the selecting, and with a use condition of the first NFC application being satisfied:
sending, by the card management unit, the first service instruction to the first NFC application, or instructing, by the card management unit, the NFC controller to send the first service instruction to the first NFC application; and
performing, by the first NFC application, the first transaction based on the first service instruction received by the first NFC application.

* * * * *